(12) United States Patent
Zhang et al.

(10) Patent No.: US 11,171,936 B2
(45) Date of Patent: Nov. 9, 2021

(54) METHOD, DEVICE, AND SYSTEM FOR OFFLOADING ALGORITHMS

(71) Applicant: Alibaba Group Holding Limited, Grand Cayman (KY)

(72) Inventors: Xiaoyu Zhang, Hangzhou (CN); Xiaowei Jiang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 134 days.

(21) Appl. No.: 16/168,507

(22) Filed: Oct. 23, 2018

(65) Prior Publication Data

US 2019/0124054 A1 Apr. 25, 2019

(30) Foreign Application Priority Data

Oct. 25, 2017 (CN) .......................... 201711015191.9

(51) Int. Cl.
*H04L 29/06* (2006.01)
*H04L 29/08* (2006.01)

(52) U.S. Cl.
CPC ...... *H04L 63/0485* (2013.01); *H04L 63/0428* (2013.01); *H04L 63/164* (2013.01); *H04L 63/166* (2013.01); *H04L 63/168* (2013.01); *H04L 63/18* (2013.01); *H04L 69/18* (2013.01); *H04L 69/321* (2013.01)

(58) Field of Classification Search
CPC ... H04L 63/0428; H04L 63/0471–0485; H04L 63/164–168; H04L 63/18; H04L 63/20–205; H04L 67/02; H04L 67/1002–1038; H04L 67/28; H04L 67/2823–2828; H04L 69/18; H04L 69/321; H04L 2209/76

See application file for complete search history.

(56) References Cited

U.S. PATENT DOCUMENTS

| | | | |
|---|---|---|---|
| 6,983,383 B1 | 1/2006 | Hartke et al. | |
| 7,068,772 B1 * | 6/2006 | Widger | H04M 3/4228 379/212.01 |
| 2002/0091844 A1 | 7/2002 | Craft et al. | |
| 2003/0026423 A1 | 2/2003 | Unger et al. | |
| 2004/0210320 A1 | 10/2004 | Pandya | |
| 2004/0264481 A1 | 12/2004 | Darling et al. | |
| 2004/0267920 A1 | 12/2004 | Hydrie et al. | |
| 2004/0268357 A1 | 12/2004 | Joy et al. | |

(Continued)

FOREIGN PATENT DOCUMENTS

| | | |
|---|---|---|
| CN | 1679015 | 10/2005 |
| CN | 1703040 | 11/2005 |

(Continued)

OTHER PUBLICATIONS

Sabin Gerald et al., "Security offload using the SmartNIC, A programmable 10 Gbps ethernet NIC", 2015 National Aerospace and Electronics Conference (NAECON), IEEE, Jun. 15, 2015, pp. 272-276.

*Primary Examiner* — Kevin Bechtel

(57) ABSTRACT

The processing load on a host processor is substantially reduced by offloading the transport layer security protocol, such as the TLS/SSL protocol, the transport layer protocol stack, such as the TCP/IP protocol stack, and the network control required to access a network, such as the Internet, onto an expansion device.

21 Claims, 17 Drawing Sheets

(56) References Cited

U.S. PATENT DOCUMENTS

| | | | |
|---|---|---|---|
| 2005/0055435 | A1 | 3/2005 | Gbadegesin et al. |
| 2007/0130352 | A1* | 6/2007 | Chhabra ................. H04L 69/22 709/230 |
| 2007/0266233 | A1 | 11/2007 | Jethanandani et al. |
| 2009/0168799 | A1 | 7/2009 | Crowley et al. |
| 2012/0163388 | A1 | 6/2012 | Goel et al. |
| 2012/0166483 | A1 | 6/2012 | Choudhary et al. |
| 2012/0281708 | A1 | 11/2012 | Chauhan et al. |
| 2013/0094356 | A1 | 4/2013 | Keith et al. |
| 2013/0336320 | A1 | 12/2013 | Rangaraman |
| 2013/0339516 | A1 | 12/2013 | Chauhan et al. |
| 2014/0108665 | A1 | 4/2014 | Arora et al. |
| 2015/0124828 | A1 | 5/2015 | Cj et al. |
| 2015/0244767 | A1 | 8/2015 | Jackowski et al. |
| 2015/0317169 | A1 | 11/2015 | Sinha et al. |
| 2015/0341285 | A1 | 11/2015 | Aysola et al. |
| 2016/0171102 | A1 | 6/2016 | Pandya |
| 2016/0330075 | A1 | 11/2016 | Tiwari et al. |
| 2016/0330301 | A1 | 11/2016 | Raindel et al. |
| 2016/0352870 | A1* | 12/2016 | Manapragada ....... H04L 63/168 |
| 2017/0099160 | A1 | 4/2017 | Mithyantha et al. |
| 2017/0147656 | A1 | 5/2017 | Choudhary et al. |
| 2017/0170987 | A1 | 6/2017 | Kumar et al. |
| 2017/0317932 | A1 | 11/2017 | Paramasivam |
| 2018/0091483 | A1 | 3/2018 | Eiriksson et al. |

FOREIGN PATENT DOCUMENTS

| | | |
|---|---|---|
| CN | 1809057 | 7/2006 |
| CN | 1905524 | 1/2007 |
| CN | 101171573 | 4/2008 |
| CN | 102143218 | 8/2011 |
| EP | 1657878 | 5/2006 |

* cited by examiner

METHOD, DEVICE, AND SYSTEM FOR OFFLOADING ALGORITHMS

CROSS-REFERENCE TO RELATED APPLICATIONS

This application claims priority to Chinese Patent Application No. 201711015191.9, filed on Oct. 25, 2017, which is incorporated herein by reference in its entirety.

BACKGROUND OF THE INVENTION

1. Field of the Invention

The present application relates to the Internet and, in particular, to a method, a device and a system for offloading an algorithm.

2. Description of the Related Art

With the development of Internet technology, users can access a variety of different information, and receive various online services, such as online shopping, payment, and money transfer. HTTP (Hyper Text Transfer Protocol) is currently one of the most widely used application layer protocol on the Internet. HTTP communicates based on the TCP protocol of the transport layer, and transmits hypertext files between a client and a server.

However, since the Internet is an open environment, and in the case that the HTTP protocol is used to transfer information between a web browser and a network server, the content is sent in clear text, and no data encryption is provided in any way. As a result, if an attacker intercepts the transmission message between the web browser and the network server, the information can be read directly by the attacker. Therefore, the HTTP protocol is not suitable for transmitting some sensitive information, such as bank card numbers and passwords.

SSL (Secure Sockets Layer) and its successor, Transport Layer Security (TLS), are a type of secure transport protocol that provides security and data integrity for network communications. Adding the SSL protocol on top of the HTTP (that is, HTTPS, Hyper Text Transfer Protocol over Secure Socket Layer) can achieve secure transmission of data. Therefore, HTTPS is an HTTP channel with the purpose of security. It can perform data encryption transmission and identity authentication between a web browser and a network server, and can be used for transmission of sensitive information, such as transaction payments.

At present, TLS/SSL is one of the most widely used security protocol layer in existing network communication, and many Internet companies have already proposed the goal of HTTPS for the whole web. But a significant cost of the employment of the TLS/SSL protocol is the high computational density in the handshake negotiation (encryption/decryption/compression/decompression steps, etc.). The server host takes a lot of time for processing (this is also the main reason why HTTPS is significantly slower than HTTP).

By means of hardware acceleration and offload (offload herein refers to processing or running some algorithms that would have been run in the CPU of a server by adding chips or other PCI cards, thereby reducing the consumption of server CPU resources), the operations, such as computationally intensive encryption and decryption algorithms, can be performed separately from the CPU of the server host, thereby enabling the CPU to handle more requests at the protocol stack and operating system levels so as to achieve the purpose of less delay and improved performance. However, in the traditional TLS/SSL offloading method, a partial offloading approach is adopted. That is, the entire process of the network protocol is still running on the host, and only some of the steps are offload.

In the prior art, a special TTL/SSL hardware acceleration card is used to perform SSL offloading from the server. The TTL/SSL hardware acceleration card performs operations such as TTL/SSL encryption and decryption algorithms, thereby reducing the computational pressure caused by running the TTL/SSL encryption and decryption algorithm steps on the server.

FIG. 1 shows a block diagram that illustrates a conventional offload server 100. As shown in FIG. 1, offload server 100 includes a host 110, a network card 120, and a TLS/SSL accelerator card 130, which are interconnected by an external bus 140 and a bus protocol. Host 110 can run an application for providing a Web service, security layer protocol stack (TLS/SSL) software, a TCP/IP protocol stack, an expansion card driver, and the like.

The application completes the hardware offloading of the security protocol algorithm by calling an interface of the transport layer security framework (TLS/SSL) through the driver of the TLS/SSL accelerator card, completing the TCP/IP protocol stack processing through the kernel of the host, and sending and receiving the underlying network message via the driver of the network card.

The network card receives the configuration of the control side through the host interface, and completes processing and forwarding of data side through a controller. On the TLS/SSL accelerator card, there are usually multiple hardware acceleration units for parallel processing used for offloading and decrypting algorithms. All algorithm acceleration kernels perform task dispatch and data domain isolation through a trusted arbitration unit.

FIGS. 2(a) and 2(b) show diagrams that illustrate a method of operating a conventional offload server. FIG. 2(a) shows a method 200 of sending a communication, while FIG. 2(b) shows a method 260 of receiving a communication. As shown in FIG. 2(a), method 200 begins at 210 where an application running on a host generates a command which is to be sent to a remote host via a network like the Internet. The application formats the command according to the transport protocol to be used, such as TCP/IP or UDP. For example, the TCP/IP protocol expects to receive the command as a stream of bytes.

Following this, method 200 moves to 212 where the host determines whether the command requires encryption, such as TLS/SSL encryption. When encryption is not required, method 200 moves to 214 where the host processes the command through the transport layer protocol stack. When the TCP/IP protocol is used, the layers of the TCP/IP protocol stack divide the stream of bytes received from the application layer into segments, and attach headers to the segments. The header can include sender and receiver information, segment order information, and error correction information.

As a segment moves through the TCP/IP protocol stack, the layers of the protocol stack add fields to the header in a process known as encapsulation. The TCP/IP protocol stack running on the host formats the segments into IP datagrams. An IP datagram has a header that includes the IP addresses of the remote host, along with datagram length and sequence order.

Method 200 next moves to 216 where the host sends the IP datagrams to a network interface card (NIC) via an external bus. The NIC adds headers and footers to the IP datagrams to form frames. The frame header includes error correction information, e.g., a cyclic redundancy check (CRC). The IP addresses are converted into hardware addresses, and the frames are converted into electrical/ optical signals that are transmitted across a network medium.

When encryption, such as TLS/SSL encryption, is required, the host processes the TLS/SSL protocol stack, and offloads the algorithmic calculation tasks to a TLS/SSL accelerator card by way of the external bus. Following this, method 200 moves from 212 to 220 where the TLS/SSL accelerator card performs arbitration, and then to 222 to perform the calculation tasks for encryption. The result obtained is returned to the host through the bus interface, where the host processes the TCP/IP protocol stack to form IP datagrams in 214.

Thus, the workflow begins with a host initiating a task. From the application to the host TLS/SSL protocol stack, and then to the TLS/SSL accelerator card driver, the task is configured to the accelerator card hardware through a bus protocol interface. The workflow next performs arbitration and the calculation task on the acceleration card. The result obtained is returned to the host through the bus interface. The host can call these steps multiple times. Following this, the host encapsulates the encrypted data message by TCP/IP protocol, and configures it to the network card hardware through the bus protocol interface. After this, according to the setting of the control side, the network card performs corresponding outgoing operation processing on the message of the data side.

As shown in FIG. 2(b), method 260 begins at 262 where the NIC receives frames from the remote host by way of the network medium, converts the frames into IP datagrams, and sends the IP datagrams to the host via the external bus. Method 260 next moves to 264 where the host processes the IP datagrams through the TCP/IP protocol stack to obtain data segments. After this, method 260 moves to 266 where the host determines whether the data segments require decryption, such as TLS/SSL decryption. When decryption is not required, method 260 moves to 268 where the host sends the data segments to the application.

When decryption is required, the host processes the TLS/SSL protocol stack, and offloads the algorithmic calculation tasks to the TLS/SSL accelerator card by way of the external bus. Following this, method 260 moves from 266 to 270 where the TLS/SSL accelerator card performs arbitration, and then to 272 where the accelerator card performs the calculation tasks for decryption. The accelerator card returns the obtained result to the host through the bus interface, where the host sends the decrypted segments to the application in 268.

Thus, the workflow begins with the network card receiving the data message and sending it to the host through the bus protocol interface. Next, the host parses the received data message by the TCP/IP protocol stack, and the processed data is directly sent to the application if it is not encrypted. If the data is encrypted, the host sends it to the TLS/SSL protocol layer for parsing, and configures it to the accelerator card hardware by the TLS/SSL accelerator card driver through the bus protocol interface. The host may call the above steps multiple times. After this, the decrypted plaintext data is uploaded to the application.

As can be seen from the above steps, the traditional TLS/SSL offloading method reduces the computational pressure of some major encryption and decryption algorithm steps on the host, but introduces some resource consumption and delay costs to the entire process. This is because, firstly, in the traditional TLS/SSL offloading method, all traffic goes to the host. As a result, the CPU of the host still spends a considerable portion of its resources on the steps in the TCP/IP protocol stack and the protocol layer resolution of TLS/SSL.

Secondly, in each data path of transmission/reception, a plurality of driver interface calls, bus protocol interface communications, and corresponding kernel mode/client mode switching are included between the host and the two expansion cards. In addition, in the traditional "host+network card+acceleration card" structure, the interconnection between them is through the system common bus, and each data packet corresponds to multiple instances of bus data exchange, which is equivalent to significantly increasing the bus traffic burden by multiple times.

As can be seen from the above, for the entire process, new resource consumptions and delays are introduced therein. For example, when AES encrypts stream data, the cost of frequently calling an SSL offload may be greater than the cost of the server host directly calculating the encryption and decryption algorithms.

Thus, this partial offloading and optimization is not complete enough. Although it can reduce the computational pressure of some major encryption and decryption algorithm steps on the host, it also introduces some resource consumption and delay costs for the whole process. The trade-off cost introduced in such a partial offloading approach may even offset the benefits brought by the offloading approach itself in some scenarios (such as the cost of frequently calling offloading when AES encrypts streaming data is sometimes even greater than the cost of directly calculating by the host).

The technical solution of using local hardware offloading approach employed by the prior art leads to the technical problem that the resource occupation on the server host is still relatively large, and no effective solution therefor has been proposed yet.

SUMMARY OF THE INVENTION

The present invention provides an expansion device that reduces the load on a host processor. The expansion device includes a memory, a network controller, and an expansion processor that is coupled to the memory and the network controller. The expansion processor to receive an application communication formatted according to a transport protocol from an application running on a host processor by way of an external bus to form received data. The expansion processor to also determine whether the received data is to be encrypted, and process a security protocol when the received data is to be encrypted. The security protocol to generate encrypted data from the received data. In addition, the expansion processor to process a transport layer protocol stack of the transport protocol to generate an outgoing IP communication from the received data when the received data is not to be encrypted, and from the encrypted data when the received data is to be encrypted. Further, the expansion processor to send the outgoing IP communication to the network controller by way of an internal bus. The network controller to format the outgoing IP communication to form a formatted IP communication, and transmit the formatted IP communication onto a network.

The present invention also provides a method of operating an expansion device. The method includes receiving an application communication formatted according to a transport protocol from an application running on a host processor by way of an external bus to form received data. The method also includes determining whether the received data is to be encrypted, and processing a security protocol when the received data is to be encrypted. The security protocol to generate encrypted data from the received data. In addition, the method includes processing a transport layer protocol stack of the transport protocol to generate an outgoing IP communication from the received data when the received data is not to be encrypted, and from the encrypted data when the received data is to be encrypted. The method also includes sending the outgoing IP communication to a network controller by way of an internal bus. Further, the method includes formatting the outgoing IP communication to form a formatted IP communication, and transmitting the formatted IP communication onto a network.

The present invention further includes a non-transitory computer-readable storage medium having embedded therein program instructions, which when executed by a processor causes the processor to execute a method of operating an expansion device. The method includes receiving an application communication formatted according to a transport protocol from an application running on a host processor by way of an external bus to form received data. The method also includes determining whether the received data is to be encrypted, and processing a security protocol when the received data is to be encrypted. The security protocol to generate encrypted data from the received data. In addition, the method includes processing a transport layer protocol stack of the transport protocol to generate an outgoing IP communication from the received data when the received data is not to be encrypted, and from the encrypted data when the received data is to be encrypted. The method also includes sending the outgoing IP communication to a network controller by way of an internal bus. Further, the method includes formatting the outgoing IP communication to form a formatted IP communication, and transmitting the formatted IP communication onto a network.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

The drawings described herein are provided for further understanding of the present application, and form a part of the present application. The exemplary embodiments of the present application and the description thereof are for explaining the present application and do not constitute an undue limitation to the scope of the present application.

FIG. 2(a) illustrates a method 200 of sending a communication, while FIG. 2(b) illustrates a method 250 of receiving a communication.

FIG. 5(a) is a flow chart illustrating an example of an offloading method 500. FIG. 5(b) is a flow chart illustrating an alternate example of an offloading method 520. FIG. 5(c) is a flow chart illustrating an example of a method 530 that implements step 510 in accordance with the present invention. FIG. 5(d) is a flow chart illustrating an example of a method 540 that implements step 512 in accordance with the present invention.

FIG. 6(a) illustrates an example of a method 600 of sending a communication, while FIG. 6(b) illustrates an example of a method 660 of receiving a communication.

FIG. 7(a) is a flow chart illustrating an example of an offloading method 700. FIG. 7(b) is a flow chart illustrating an example of a method 730 included within step 712 in accordance with the present invention. FIG. 7(c) is a flow chart illustrating an example of a method 740 included within step 714 in accordance with the present invention. FIG. 7(d) is a flow chart illustrating an example of a method 750 included within step 710 in accordance with the present invention. FIG. 7(e) is a flow chart illustrating an example of a method 770 included within step 712 in accordance with the present invention.

DETAILED DESCRIPTION OF THE INVENTION

Figure 1:
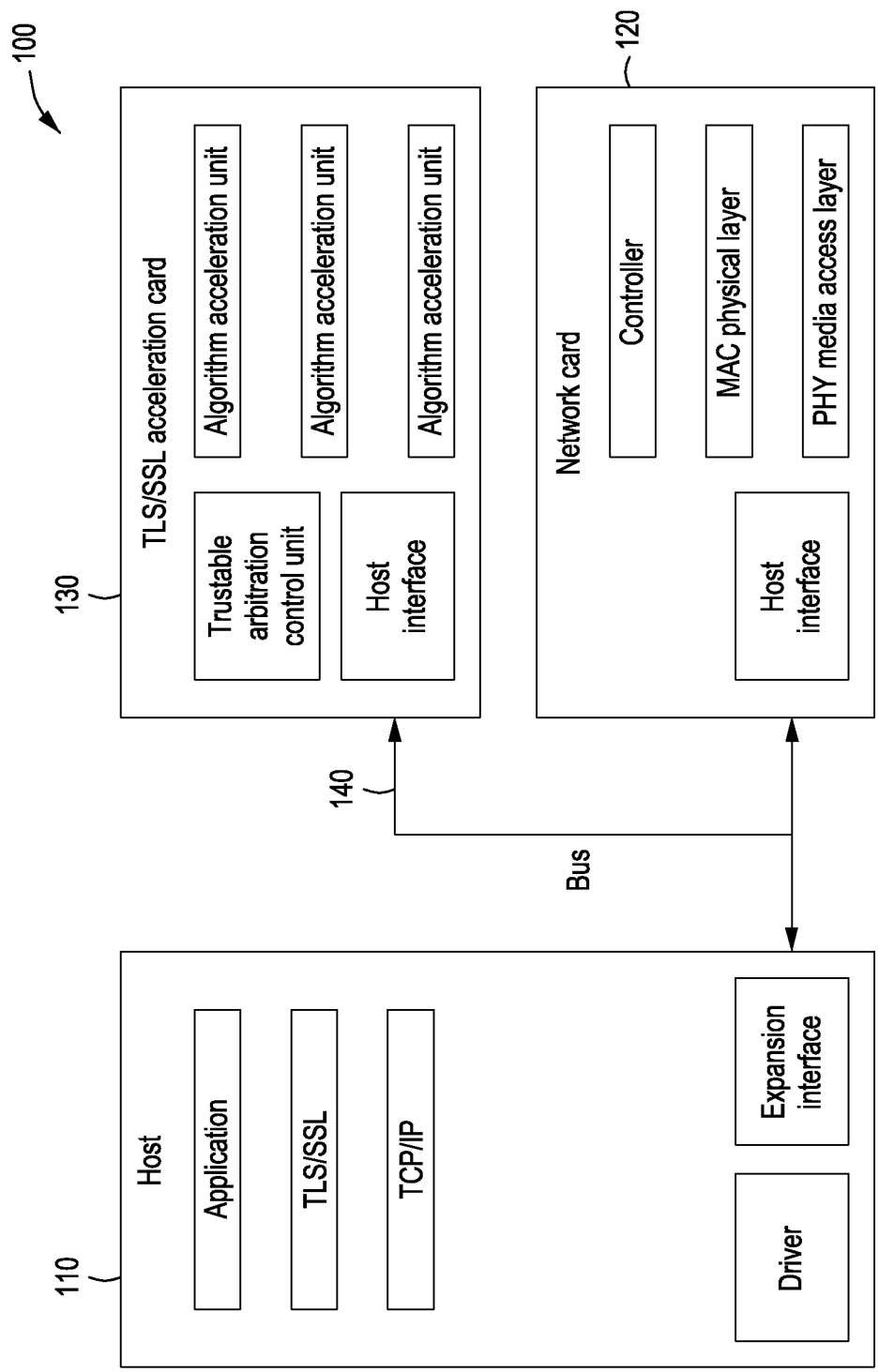
FIG. 1 is a block diagram illustrating a conventional offload server 100.
Figure 2A:
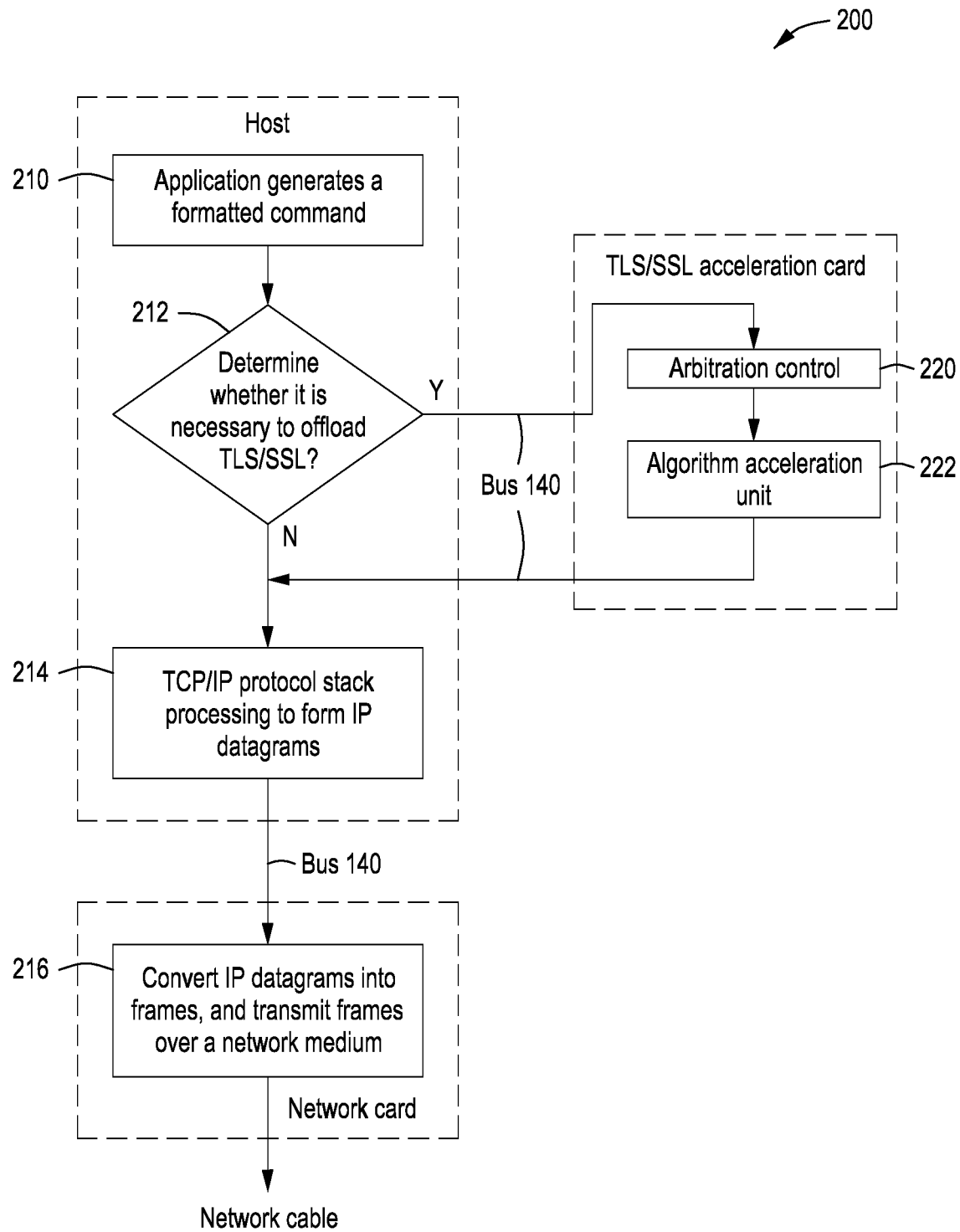
FIGS. 2(a) and 2(b) are diagrams illustrating a method of operating a conventional offload server.
Figure 2B:
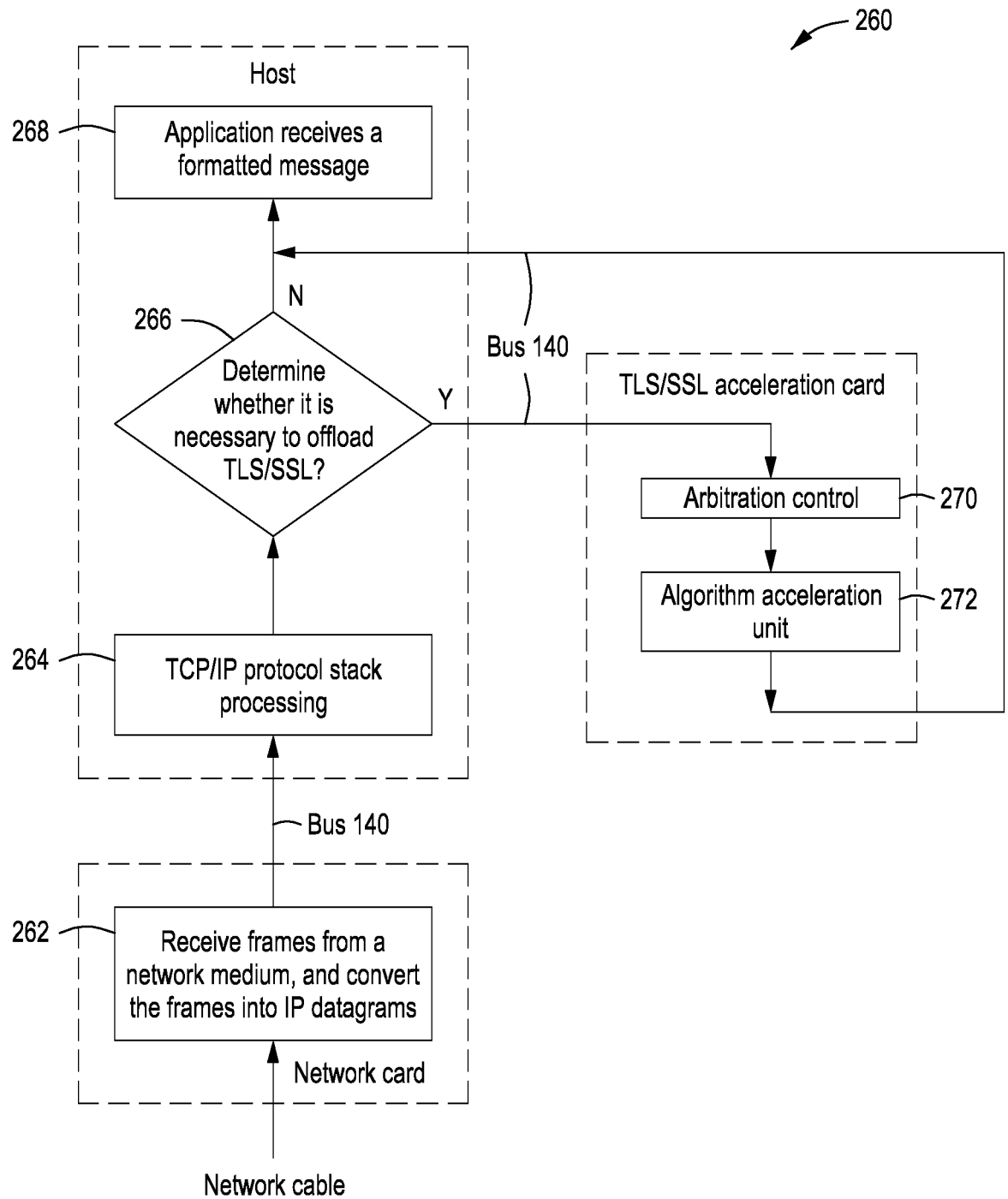

In order to enable a person of ordinary skill in the art to better understand the solutions of the present application, the technical solutions in the embodiments of the present application will be further described in detail in a clear and complete way in reference to the accompanying drawings of the embodiments of the present application. It is apparent that the described embodiments are only a part of the embodiments of the present application, rather than all of the embodiments of the present invention. All other embodiments obtained by a person of ordinary skill in the art based on the embodiments of the present application without departing from the inventive scope shall fall within the scope of the application.

The terms "first," "second," and the like in the specification and claims of the present application and the drawings provided above are used to distinguish similar objects, and are not necessarily used to describe a specific order or sequence. The data so used may be interchanged where appropriate so that the embodiments of the present application described herein can be implemented in a sequence other than those illustrated or described herein.

In addition, the terms "comprises" and "comprising" and any alternative forms thereof are intended to define a non-exclusive inclusion. For example, a process, method, system, product, or device that comprises a series of steps or units is not necessarily limited to those steps or units, and may include other steps or units not explicitly listed herein or inherent to such processes, methods, products or devices.

First, some of the nouns or terms that appear in the process of describing the embodiments of the present application are defined as follows.

SSL: (Secure Socket Layer) is a layer of protocol between a reliable connection-oriented network layer protocol and an application layer protocol. SSL ensures data integrity through mutual authentication and the employment of digital signatures, and data privacy through encryption so as to achieve secure communication between the client and server. The protocol consists of two layers: the SSL record protocol and the SSL handshake protocol.

TLS: (Transport Layer Security) is used to provide confidentiality and data integrity between two communication applications. The protocol consists of two layers: the TLS record protocol and the TLS handshake protocol.

HTTP: (Hyper Text Transfer Protocol) is a transport protocol for transmitting hypertext from a network server to a local web browser to send content in clear text. It does not provide any way of data encryption, and is not suitable for transmitting sensitive information, such as bank card numbers, passwords, and other information.

HTTPS: (Hyper Text Transfer Protocol over Secure Socket Layer) is an HTTP channel for the purpose of security, that is, the SSL protocol is added to HTTP. Data encryption transmission and identity authentication are performed on a web browser and a network server. It can be used for transmission of sensitive information such as transaction payments.

NIC: (Network Interface Card, network card, also referred to as NIC) is a hardware device that connects a computer to a network. Regardless of a twisted pair cable connection, a coaxial cable connection, or an optical fiber connection, data communication must be performed by means of a network card. The Smart NIC refers to an intelligent network card.

TOE: (TCP Offload Engine) uses a dedicated processor on the network card to perform some or all of the data packet processing tasks, that is, by using a dedicated network card equipped with a TOE chip. Four layers of processing requests including TCP can be transferred from the host processor to the NIC so as to improve server performance while accelerating network response.

MAC: (Media Access Control) is a sub-layer of the data link layer. The data link layer is divided into two sub-layers: LLC (Logical Link Control) and MAC. The upper LLC sub-layer is used to implement hardware-independent functions of the data link layer, such as flow control, error recovery, and so on, while the lower MAC sublayer provides an interface between the LLC and the physical layer.

PHY: (Physical Layer) is the lowest layer of OSI. A network card works in the physical layer (the first layer) and the data link layer (the second layer) of the OSI, in which the physical layer defines the electrical and optical signals, line states, clock references, data coding, and circuits required for data transmission and reception, and provides standard interfaces to data link layer devices. The data link layer provides functions such as addressing mechanisms, data frame construction, data error checking, transmission control, and providing standard data interfaces to the network layer.

RSA: (RSA algorithm) is currently the most influential and most commonly used public key encryption algorithm. It is an asymmetric cryptographic algorithm, which requires a pair of keys. If one of the keys is used in the encryptions, the other one is required in the decryption.

AES: (Advanced Encryption Standard) is one of the algorithms in symmetric key encryption.

Offload: The term of offloading mentioned in the embodiments of the present application refers to a process in which a protocol or encryption algorithm that the server CPU needs to support is taken over by an embedded chip or PCI card built into the system, thereby reducing the resource occupation of the server CPU and providing better system performance. For example, TTL/SSL offloading refers to instead of running the TTL/SSL protocol-related encryption and decryption algorithms on the server CPU, it is carried out on a hardware acceleration card (or expansion card) that is independent of the CPU.

In addition, the system for offloading an algorithm provided by the embodiments of the present application carries out the related operations of the protocols on the server (for example, TTL/SSL protocol, TCP/IP protocol stack processing and corresponding offload control, etc.). TTL/SSL encryption and decryption algorithms and the control and data path related to the basic network card function by an expansion device that is independent from the server CPU, thereby achieving global offload of the server.

According to an embodiment of the present application, an example of an offloading method is provided. It should be noted that this example can be used to accelerate the host of a website server in the process of data transmission between a web browser and the website server based on the HTTPS protocol.

Currently, in order to improve the security of data transmission, most applications or services use HTTPS to transfer data between a web browser and a website server. HTTPS is a combination of HTTP and TTL/SSL protocols. TTL/SSL is a type of encryption protocol, which does not have practical application significance. When the website server runs the HTTP protocol, the TTL/SSL encryption and decryption will consume relatively large CPU resources on the server host and reduce the performance of the server. As a result, the response speed of the website server to the web browser is slow, which seriously affects the user's online experience.

Figure 3:
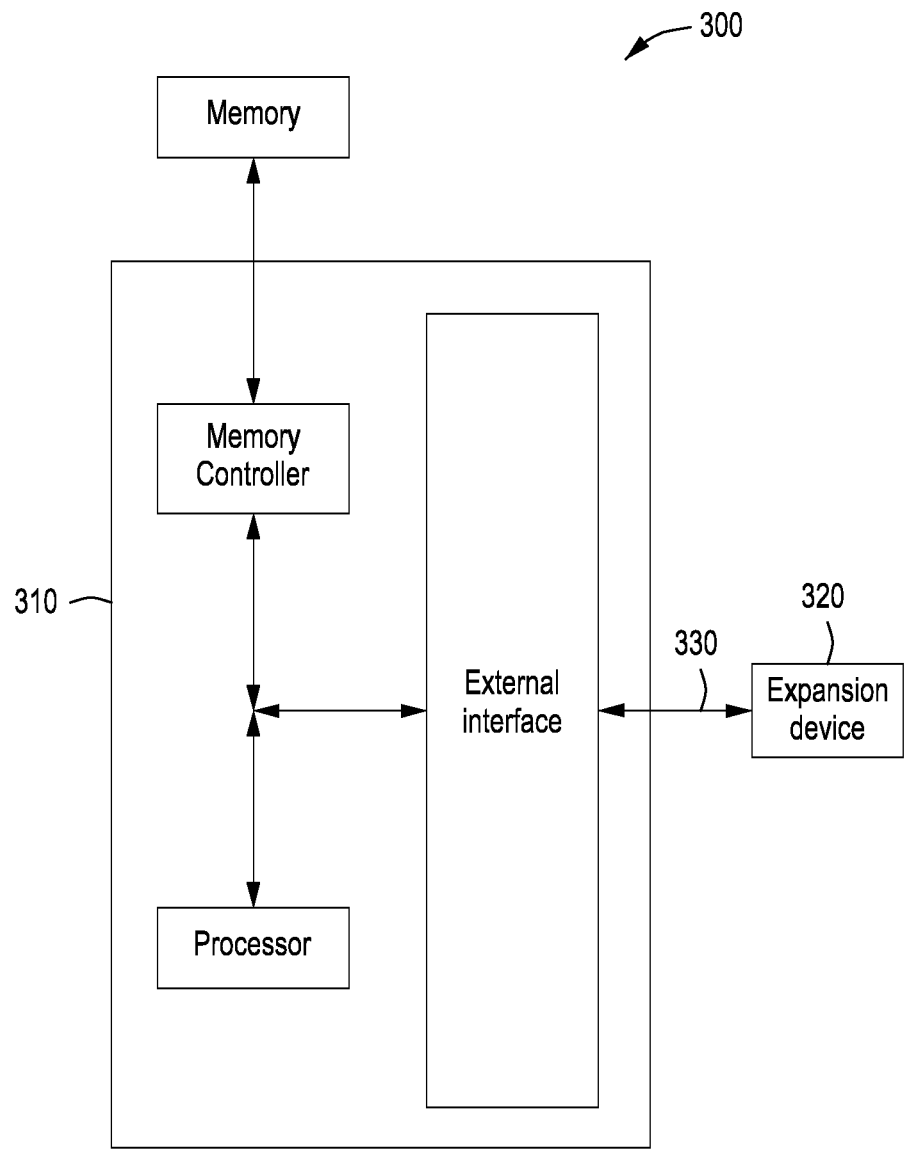
FIG. 3 is a block diagram illustrating an example of an offload server 300 in accordance with the present invention.

FIG. 3 shows a block diagram that illustrates an example of an offload server 300 in accordance with the present invention. As described in greater detail below, in addition to offloading the SSL encryption/decryption algorithms in the HTTPS application, the TCP/IP protocol stack and the TTL/SSL protocol layer are also offloaded to an acceleration card. In addition, network processing can also be provided by the acceleration card. As a result, the security protocol algorithm, the handshake process, and the full hardware offload of the underlying network protocol stack processing can be completed on the TTL/SSL hardware acceleration card so as to reduce the occupation of CPU resources of the server host.

As shown in FIG. 3, offload server 300 includes a host 310 and an expansion device 320. Host 310 can be a server host for data transmission based on the HTTPS protocol including, but not limited to, any HTTPS application-based website or service server for providing a Web service-based application program, an expansion device (expansion card) driver, and the like.

Expansion device 320 is coupled to host 310 through an external bus 330. Expansion device 320 can be used to offload related protocols from the server. For example, TTL/SSL protocol stack (including the TTL/SSL encryption and decryption algorithms) processing, TCP/IP protocol stack processing, network processing (the processing of control and data paths related to basic network card functions during the process of data transmission by host 310 based on the HTTPS protocol), and corresponding offloading control thereof can be offloaded so as to reduce CPU resource consumption of host 310. When data transmission is performed between the server host and the web browser based on the HTTPS protocol, data transmission and reception are included.

Figure 4:
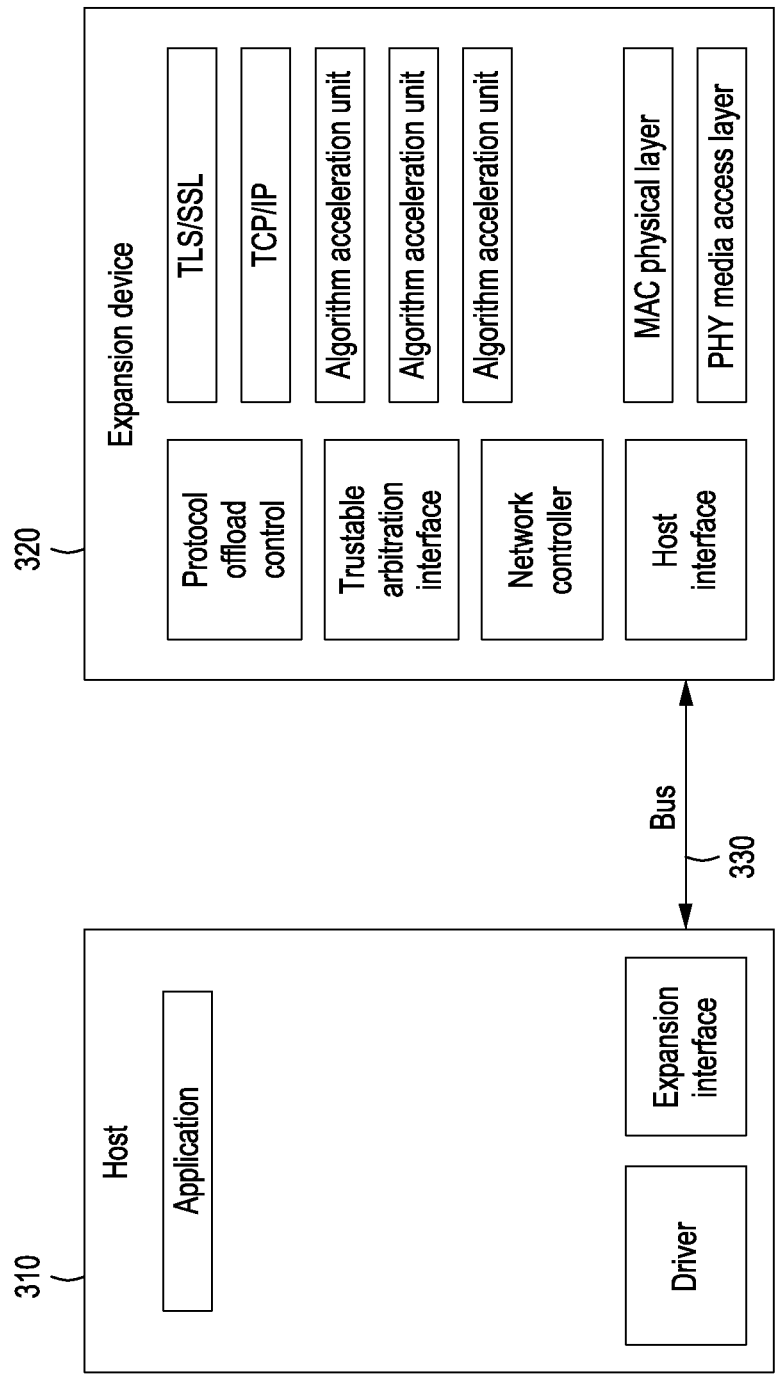
FIG. 4 is a block diagram illustrating a further example of offload server 300 in accordance with the present invention.

FIG. 4 shows a block diagram that illustrates a further example of offload server 300 in accordance with the present invention. As shown in FIG. 3, host 310 mainly runs the application and expansion card driver for providing the Web service, and the like. Expansion device 320 (also referred to as an "expansion card," "acceleration network card," and so on) includes a related protocol (TCP/IP protocol stack, TLS/SSL protocol layer and corresponding offload control, etc.) offload module, TLS/SSL algorithm hardware acceleration module, control and data path module related to basic network card function, and so on. That is, the security layer protocol stack software and TCP/IP protocol stack are offload to expansion device 320 (also referred to as an acceleration network card, expansion card). Host 310 and expansion card 320 are interconnected by an external bus 330 and a host bus protocol.

Expansion device 320 communicates with the application of host 310 through the host interface (in a full offload mode, the data in the interface communication is plaintext). The application fully offloads the data paths required for the corresponding TLS/SSL processing, TCP/IP encapsulation and the processing of application data in other network communication processing to expansion device 320 (TLS/SSL Acceleration Network Card) by means of calling the interface of the transport layer security framework (TLS/SSL). Expansion device 320 completes the security protocol algorithm, the handshake process, and the full hardware offload of the underlying network protocol stack processing.

Expansion device 320 (that is, the expansion card) generally has a plurality of hardware acceleration units processed in parallel for offloading the encryption and decryption algorithms. All of these algorithm acceleration kernels can have task dispatch and data domain isolation through a trusted arbitration unit.

As an optional implementation solution of the present invention, when the server host sends a data packet to the web browser, host 310 initiates a task of sending a data packet, and the application of host 310 calls an interface of the transport layer security protocol of expansion device 320. Expansion device 320 is configured to start a local transport layer security protocol (TLS/SSL) to process a task according to an interface called by the host. After the transport layer security protocol (TLS/SSL) processes the task, expansion device 320 uses a network protocol processing unit to encapsulate the processing result as a data message, and a network controller deployed in expansion device 320 sends out the encapsulated data message.

Optionally, when expansion device 320 starts the local transport layer security protocol (TLS/SSL) to process the task, it may first determine whether the transport layer security protocol (TLS/SSL) needs to be used to process the task. In the case that it is necessary to use the transport layer security protocol (TLS/SSL) to process the task, the task will be arbitrated. Following this, the task is sent to the algorithm acceleration unit for processing so as to obtain the processing result of the task.

After expansion device 320 sends the task to the algorithm acceleration unit for processing, it then obtains the processing result of the task. Expansion device 320 further encapsulates the processing result of the task by using a network protocol processing unit, and configures the encapsulating result to a network controller. Next, the network controller sends out the encapsulated data message.

As can be seen from the above description, after the host initiates the task including data transmission, expansion device 320 completes the functions of transport layer security protocol (for example, TLS/SSL) algorithm, the network protocol (for example, TCP/IP) encapsulation, and the underlying layer network protocol stack.

As an optional embodiment of the present invention, on expansion device 320, a software stack can be used to run the service of the transport layer security protocol. The engine unit of the transport layer security protocol can be used to perform offloading of the encryption and decryption algorithms so as to perform hardware acceleration processing of network protocol (TCP/IP) through the TCP offload engine (TOE).

Based on the foregoing embodiment, as an optional embodiment of the present invention, prior to expansion apparatus 320 encapsulating the processing result as a data message by using the network (TCP/IP) protocol processing unit, it may first determine whether the TCP offload engine (TOE) exists in expansion device 320. In the case where there is a TCP offload engine (TOE) in expansion device 320, the hardware acceleration processing of the network protocol (TCP/IP) is performed using the TCP offload engine (TOE).

Optionally, if there is no TCP offload engine (TOE) in expansion device 320, it is determined whether the resource (for example, CPU resource) usage of expansion device 320 exceeds a predetermined threshold. If so, a load balancing scheduling module is used (also referred to as "traffic scheduling module") to bypass part of the traffic to the host for processing.

As another optional embodiment of the present invention, when server host 310 receives the data packet from the web browser, expansion device 320 receives the data message and transmits the data message to the network protocol processing unit (for example, a TCP/IP processing unit) using the local network controller to perform parsing. It then obtains the parsing result, and processes the parsing result using the local transport layer security protocol (TLS/SSL) so as to obtain the processing result. Next, the processing result is uploaded to the host.

As an optional embodiment, expansion device 320 can perform hardware acceleration processing of a network protocol (TCP/IP) through the TCP offload engine (TOE). When expansion device 320 receives the data message, it can first determine whether the TCP offload engine (TOE) exists in expansion device 320. If there is a TCP offload engine (TOE) in expansion device 320, it will use the TCP offload engine (TOE) to perform hardware acceleration processing of the network protocol processing unit (for example, a TCP/IP processing unit) and store the data message in a memory area of the processor.

Optionally, after the data message is stored in the memory area of the processor, the processor performs protocol stack processing on the data message. If TLS offloading is necessary, it will be sent to the secure sockets layer (SSL) for decryption processing, and the transport layer security protocol will be called to finish the hardware acceleration. If the TLS offload is not necessary, the decryption result will be uploaded to the application on the processor or uploaded to the host through the host bus according to the type and destination address of the decrypted result.

Optionally, when expansion device 320 receives the data message, and uses a local network controller to transmit the data message to a network (TCP/IP) protocol processing unit for parsing, the parsing result is then obtained. After that, it can be determined whether the data in the parsing result is encrypted. In the case where the data in the parsing result is not encrypted, expansion device 320 directly uploads the parsing result to host 310. In the case where the data in the parsing result is encrypted, the local transport layer security protocol (TLS/SSL) will be further used to process the parsing result.

Specifically, when the parsing result is processed by using the local transport layer security protocol (TLS/SSL), the processor of expansion device 320 can first determine whether the parsing result needs to be sent to the secure socket layer of the transport layer security protocol for processing. In the case where the parsing result needs to be sent to the secure socket layer of the transport layer security protocol, the parsing result will be processed using the secure socket layer of the transport layer security protocol. In the case where the parsing result does not need to be sent to the secure layer of the transport layer security protocol for processing, it will be bypassed to the host to process the parsing result.

As a first optional embodiment in this case, in the process of processing the parsing result using the secure socket layer of the transport layer security protocol, the TCP offload engine uses the transport layer encryption device to encrypt and decrypt the data by means of calling the driver thereof. If the encryption and decryption result satisfies a predetermined condition, it is uploaded to host 310.

As a second embodiment in this case, in the process of processing the parsing result using the secure socket layer of the transport layer security protocol, the TCP offload engine uses the transport layer encryption device to decrypt the data by means of calling the driver thereof, and then uploads the decryption result to the application on the processor according to the type and the destination address of the decryption result, or uploads it to host 310 through the bus.

Based on any of the optional embodiments described above, when expansion device 320 processes the parsing result using the local transport layer security protocol (TLS/SSL), the transport layer security protocol (TLS/SSL) layer processes the parsing result to obtain a processing result. The obtained processing result is further arbitrated, and sent to the corresponding algorithm acceleration unit for encryption and decryption processing so as to obtain a decryption result.

For certain special needs of some applications (such as the firmware hot upgrade of the acceleration network card, etc.), the protocol stacks such as TCP/IP and TLS/SSL of the host can be employed for processing, which is equivalent to a compatible version of the traditional TLS/SSL offloading solution. Once the operations such as hot upgrade are carried out, the host can still switch back to the full offloading solution to reduce load and increase efficiency.

In the TLS/SSL full offloading solution provided by the embodiments of the present application, the expansion card completes almost all processes under the TLS/SSL protocol layer, and can significantly reduce the computing pressure on the host. In a specific implementation, it may have many different specific forms, for example, the ARM kernel intelligent network card+TLS/SSL hardware acceleration module+TOE, and so on.

According to some embodiments of the present application, another example of offloading an algorithm is also provided, which can be used in the process where a server host that performs data transmission based on the HTTPS protocol sends data to a web browser. This example may be used in the system for offloading an algorithm as described with respect to offload servers 300 and 400. This offloading method can be used in a case including, but not limited to, the scenario described with respect to offload servers 300 and 400. It should be noted that the steps shown in the flowchart of the accompanying drawings may be executed in a computer system such as a set of computer executable instructions, and, although the logical order is shown in the flowchart, in some cases, the steps shown or described herein may be performed in an order different from the one shown herein.

Due to the fact that the currently available hardware offload acceleration solution of the server host based on the HTTPS protocol can only offload the part related to the TTL/SSL encryption and decryption algorithm in a process of data transmission based on the HTTP protocol, the server host still needs to consume a large amount of CPU resources for related protocols (for example, TTL/SSL protocol, TCP/IP protocol stack processing and the corresponding offload control), the TTL/SSL encryption and decryption algorithm, and the control and data path related to the basic network card function, and so on.

FIGS. 5(*a*)-5(*d*) show flow charts that illustrate examples of offloading methods in accordance with the present invention. FIG. 5(*a*) shows a flow chart that illustrates an example of an offloading method 500. FIG. 5(*b*) shows a flow chart that illustrates an alternate example of an offloading method 520. FIG. 5(*c*) shows a flow chart that illustrates an example of a method 530 that implements step 510 in accordance with the present invention. FIG. 5(*d*) shows a flow chart that illustrates an example of a method 540 that implements step 512 in accordance with the present invention.

As shown in FIG. 5(*a*), method 500 begins at 510 where an expansion device starts a local transport layer security protocol to process a task according to an interface called by a host. As an optional embodiment of the present invention, the host can be a server host for data transmission based on the HTTPS protocol including, but not limited to, any HTTPS application-based website or service server.

The expansion device mentioned above can be an expansion card or a hardware acceleration network card integrated with a TLS/SSL protocol processing module and a TCP/IP protocol layer processing module, which can be used for performing TLS/SSL processing and TCP/IP encapsulation and so on for the application data on the host. The host communicates with the expansion device through the bus interface so that the host only needs to provide a Web service-based application and an expansion card driver.

Since the host and the extension device are connected through the bus interface, when the host needs to send data, a task of sending data can be established. In addition, a corresponding interface on the expansion device (for example, TLS/SSL interface) can be called by the host so that the expansion device can start the local transport layer security protocol (TLS/SSL) to handle the current task (for example, TLS/SSL encryption processing).

The above expansion device can enable a corresponding protocol offloading process according to the interface called by the host. In such a case, the TLS/SSL protocol layer (that is, the transport layer security protocol layer) on the expansion device can perform process control on the protocol offloading process of the server host. For example, if there is a computing task, an arbitration can be performed, and the computing task can be further dispatched to a corresponding algorithm hardware acceleration unit until the calculation result is returned. Optionally, the above process control operation may be performed multiple times depending on different situations.

Referring again to FIG. 5, method 500 next moves to 512 where, after the transport layer security protocol (TLS/SSL) processes the task, the expansion device uses a network protocol processing unit to encapsulate the processing result as a data message.

As an optional embodiment, the network protocol processing unit mentioned above may be configured to perform TCP/IP encapsulation on the data message sent by a host when the host provides the Web service, and perform TCP/IP protocol stack parsing operation on the received data message. Thus, when the server host (that is, the host mentioned above) sends data, the corresponding interface on the expansion device (for example, a TLS/SSL interface) can be called so that the expansion device starts a local transport layer security protocol (TLS/SSL) to perform TLS/SSL encryption processing on the current task. In addition, the corresponding interface on the expansion device can obtain the processing result, which is then encapsulated as a data message and configured to the network controller through a bus protocol interface.

Method 500 next moves to 514 where the network controller deployed in the expansion device sends out the encapsulated data message. In 514, when the TCP/IP protocol stack processing unit on the expansion device encapsulates the encrypted data message by TCP/IP protocol and configures it to the network controller, the network controller, according to the setting of the control side, performs corresponding outgoing operation processing on the data message on the data side.

Taking offload server 400 of FIG. 4 as an example, the hardware acceleration solution of full TLS/SSL offloading provided by the embodiment of the present application mainly includes the following modules: a host 310 and an expansion device 320 (that is, a TLS/SSL offload acceleration network card, and for the sake of brevity, the term "expansion card" or "acceleration network card" is used in the description of the solution of the present application instead of the term "TLS/SSL full offloading hardware acceleration network card"). Host 310 and expansion device 320 are interconnected by external bus 330 and the host bus protocol.

In this case, host 310 is used to provide an application and expansion card driver for the web service, and so on. The security layer protocol stack software, TCP/IP protocol stack, as options, can be offload to the acceleration network card or can be completed on the host computer. After the application calls the transport layer security framework (TLS/SSL) interface, the subsequent data paths are fully offload to the TLS/SSL acceleration network card so as to complete the full hardware offload of the security protocol algorithm, the handshake process, and the underlying network protocol stack processing.

For certain special needs of some applications (such as acceleration network card firmware hot upgrade, and the like), the TCP/IP, TLS/SSL and other protocol stacks of the host can be employed for processing, which is equivalent to a compatible version of the traditional TLS/SSL offloading solution. Once the operations such as hot upgrade are completed, the host can still switch back to the full offloading solution to reduce load and increase efficiency.

Expansion device 320 (that is, TLS/SSL full offloading hardware acceleration network card) includes related protocol offload (TCP/IP protocol stack, TLS/SSL protocol layer and corresponding offload control), TLS/SSL algorithm hardware acceleration module, control and data path modules related to the basic network card functions. The expansion card communicates with the application through the host interface (in a full offload mode, the data in this interface communication is plaintext).

The application data are subjected to corresponding TLS/SSL processing, TCP/IP encapsulation, and other network communication processing on the expansion card. There are generally multiple hardware acceleration units for parallel processing on the expansion card for offloading the encryption and decryption algorithms. All of these algorithm acceleration kernels perform task dispatch and data domain isolation through a trusted arbitration unit.

It can be seen from the above that in the foregoing embodiment of the present application, in the process of sending data to the web browser by the server host, the expansion device starts the local transport layer security protocol (TLS/SSL) according to the interface called by the host to process the task related to the host sending data, and after the transport layer security protocol (TLS/SSL) processes the related tasks, the network protocol processing unit (for example, a TCP/IP processing unit) inside the expansion device is further used to perform TCP/IP encapsulation for the processing result as a data message.

Finally, the network controller deployed in the expansion device sends out the encapsulated data message so that the expansion card completes almost all the processes under the TLS/SSL protocol layer, thereby reducing the computational pressure on the host. More computing resources are thus provided for the application, and the technical effects of delay and throughput in the secure network protocol are ensured by the parallel computing kernel on the expansion card, thereby solving the technical problem of the local hardware offloading solution employed in the prior art that the resource usage on the server host is still relatively large.

Figure 5A:
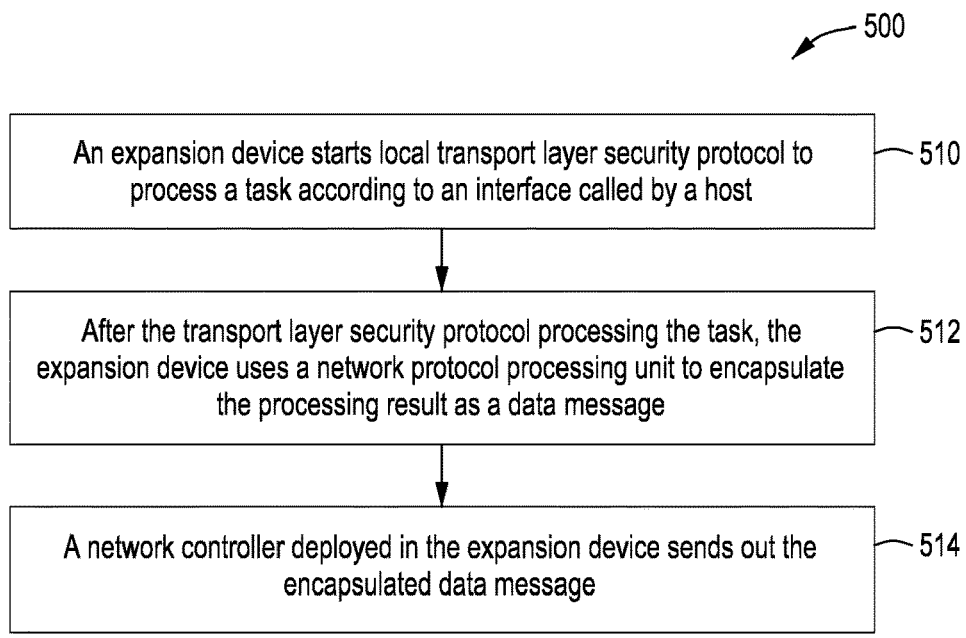
FIGS. 5(a)-5(d) are flow charts illustrating examples of offloading methods in accordance with the present invention.
Figure 5B:
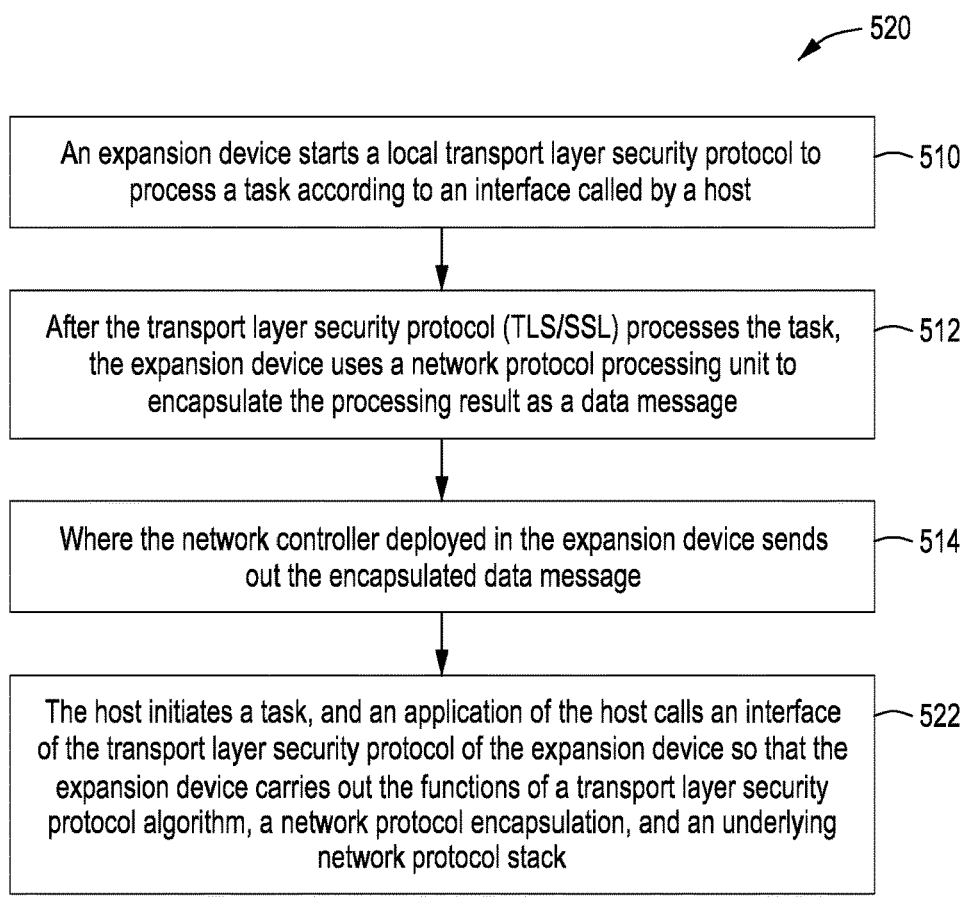

FIG. 5(b) shows a flow chart that illustrates an alternate example of an offloading method 520 in accordance with the present invention. Method 520 is similar to method 500 and, as a result, utilizes the same reference numerals to designate the elements that are common to both methods. As shown in FIG. 5(b), method 520 differs from method 500 in that, before the expansion device starts the local transport layer security protocol to process the task according to the interface called by the host, method 520 first moves to 522 where the host initiates a task, and an application of the host calls an interface of the transport layer security protocol of the expansion device so that the expansion device carries out the functions of a transport layer security protocol algorithm, a network protocol encapsulation, and an underlying network protocol stack.

Specifically, in the foregoing embodiment, the foregoing task can be a task that the server host sends data to the web browser. Because the expansion device is an expansion card or hardware acceleration network card integrated with the TLS/SSL protocol processing module and the TCP/IP protocol layer processing module, which is configured to perform TLS/SSL processing and TCP/IP encapsulation of the application data on the host, when the server host initiates a task, the host application can call the TLS/SSL interface of the expansion device and perform TLS/SSL encryption and decryption of the task of sending data, TCP/IP encapsulation, control of protocol offload flow, and the configuration of encapsulated data message to the underlying network protocol stack such as network controller through the expansion device. Through the above embodiments, almost all the processes under the TLS/SSL protocol layer are completed by the expansion card independent from the server host, and the calculation pressure on the host can be significantly reduced.

Figure 5C:
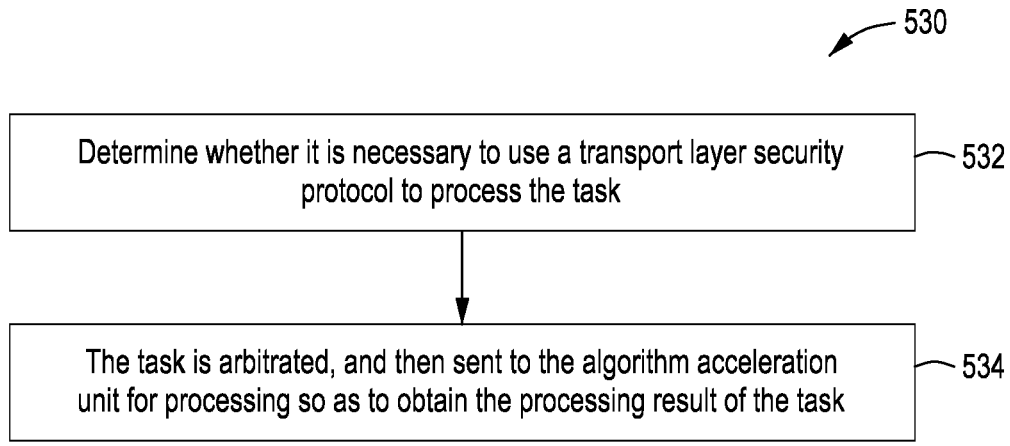

FIG. 5(c) shows a flow chart that illustrates an example of a method 530 that implements step 510 in accordance with the present invention. As shown in FIG. 5(c), method 530 begins at 532 by determining whether it is necessary to use a transport layer security protocol to process the task. When it is necessary, method 530 moves to 534 where the task is arbitrated, and then sent to the algorithm acceleration unit for processing so as to obtain the processing result of the task.

Specifically, in the foregoing embodiments, since not all of the data packets need to receive the TLS/SSL encryption and decryption operation, when the local transport layer security protocol (TLS/SSL) is started to process the task, the task initiated by the host is first determined as whether the task needs to be handled by the transport layer security protocol (TLS/SSL). In the case where the transport layer security protocol (TLS/SSL) processing is required, the task is sent to the algorithm acceleration unit in the expanded device for processing, and the processing result of the task is thus obtained.

In an optional embodiment, the extension device uses the network protocol processing unit to encapsulate the processing result as a data message. The network protocol processing unit encapsulates the processing result, and configures the encapsulating result to the network controller.

Optionally, on the expansion device, the software stack may be used to run the service of the transport layer security protocol, and the engine unit of the transport layer security protocol is further used to perform offloading the encryption and decryption algorithm, and the hardware acceleration processing of network protocols is performed through the TCP offload engine.

Figure 5D:
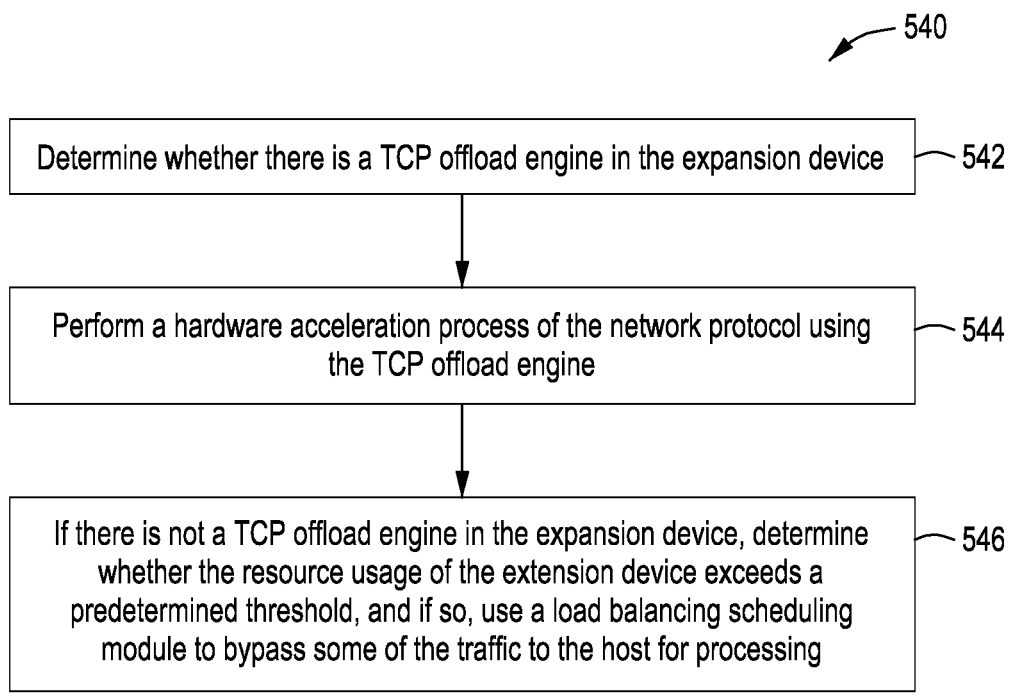

Based on the foregoing embodiments, as an optional implementation manner of the present invention, prior to the step in which the expansion device uses the network protocol processing unit to encapsulate the processing result as a data message, the foregoing method may further include the following steps:

FIG. 5(d) shows a flow chart that illustrates an example of a method 540 that implements step 512 in accordance with the present invention. As shown in FIG. 5(d), method 540 begins at 542 by determining whether there is a TCP offload engine in the expansion device. If there is a TCP offload engine in the expansion device, method 540 moves to 544 to perform a hardware acceleration process of the network protocol using the TCP offload engine.

In an optional embodiment, method 540 can move to 546 where, if there is not a TCP offload engine in the expansion device, method 540 determines whether the resource usage of the expansion device exceeds a predetermined threshold and, if so, use a load balancing scheduling module (or "traffic scheduling module") to bypass some of the traffic to the host for processing.

Figure 6A:
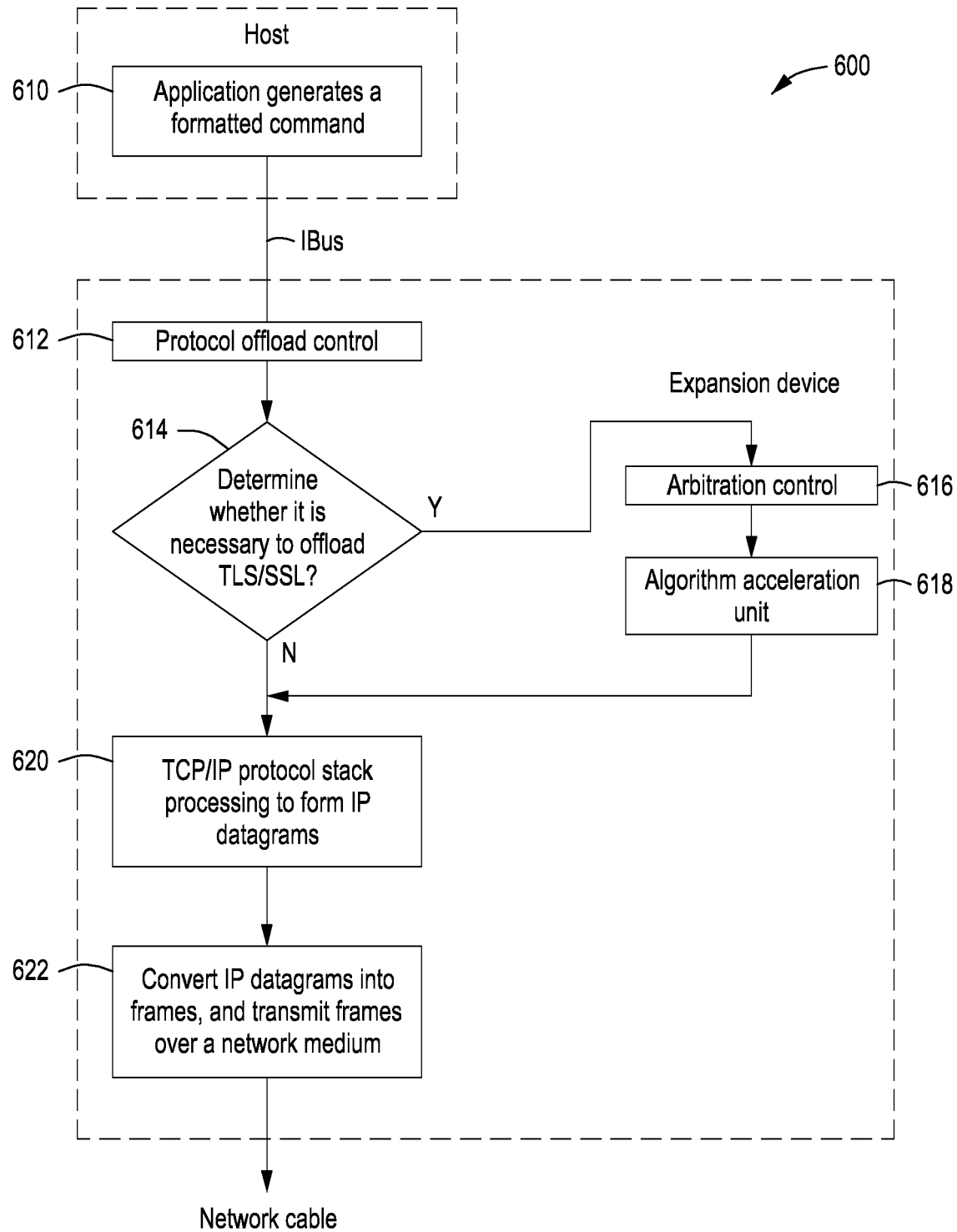
FIGS. 6(a) and 6(b) are diagrams illustrating an example of a method of operating a offload server in accordance with the present invention.
Figure 6B:
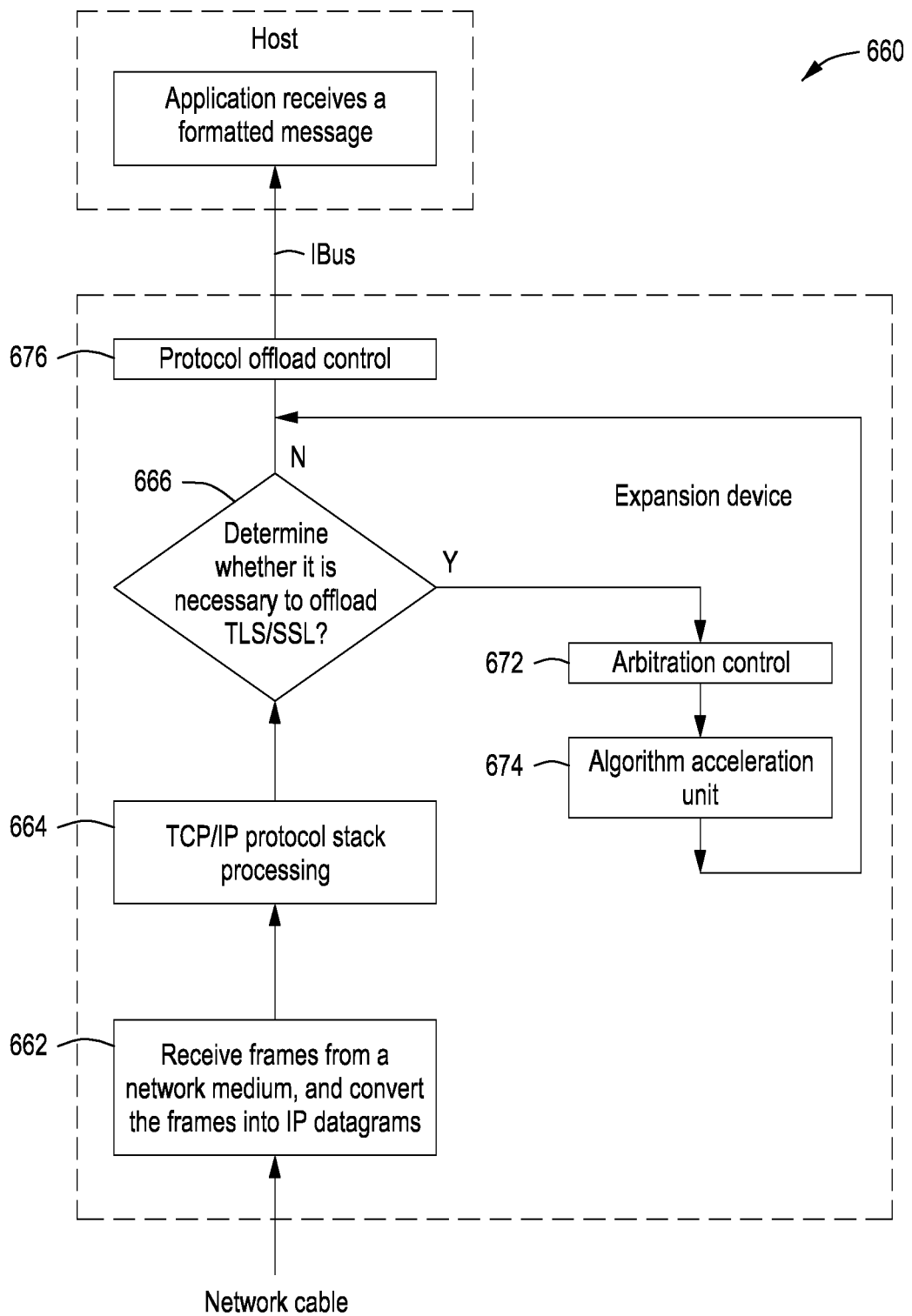

FIGS. 6(a) and 6(b) are diagrams that illustrate an example of a method of operating a offload server in accordance with the present invention. FIG. 6(a) illustrates an example of a method 600 of sending a communication, while FIG. 6(b) illustrates an example of a method 660 of receiving a communication. As shown in FIG. 6(a), method 600 begins at 610 where an application running on a host processor generates a communication which is to be sent to a remote host via a network like the Internet. The application formats the communication according to the transport protocol to be used, such as TCP/IP or UDP. For example, the TCP/IP protocol expects to receive the communication as a stream of bytes.

Following this, method 600 moves to 612 where a processor on the expansion card receives the communication (formatted according to the transport protocol to be used) from the application running on the host processor by way of an external bus to form received data. A protocol offload control unit on the expansion card enables a corresponding protocol offloading process according to the interface called by the host. In addition, the TLS/SSL protocol layer on the expansion card starts the process control.

After this, method 600 moves to 614 where the processor on the expansion card determines whether the received data requires encryption. When encryption, such as TLS/SSL encryption, is required, the processor on the expansion card processes a security protocol to generate encrypted data from the received data. The host offloads the TLS/SSL protocol stack (including the algorithmic calculation tasks) and the TCP/IP protocol stack to the expansion card by way of the external bus. When encryption is required, method 600 moves from 614 to 616 where the processor on the expansion card performs arbitration, and then to 618 to perform the calculation tasks for encryption (multiple processors can be used to perform the calculations).

When the received data does not require encryption in 614, or after encrypted data has been generated in 618, method 600 moves to 620 where the processor on the expansion card processes a transport layer protocol stack of the transport protocol to generate an outgoing IP communication from the received data when the received data is not to be encrypted, and from the encrypted data when the received data is to be encrypted.

When the TCP/IP protocol is used, the outgoing IP communication is an IP datagram. As noted above, when the TCP/IP protocol is used, the layers of the TCP/IP protocol stack divide the stream of bytes received from the application layer into segments, and attach headers to the segments, which are formatted into the IP datagrams. In addition, the processor on the expansion card can execute the TCP/IP protocol stack or, in the case where there is a TCP offload engine (TOE) in the expansion device, the hardware acceleration processing of the network protocol (TCP/IP) is performed using the TCP offload engine (TOE).

Method 600 next moves to 622 where the processor on the expansion card sends the outgoing IP communication to a network controller by way of an internal bus. The network controller formats the outgoing IP communication to form a formatted IP communication, and transmits the formatted IP communication onto a network. In a TCP/IP context, the processor on the expansion card sends the IP datagrams to the network controller via the internal bus. The network controller forms frames, which are converted into electrical/optical signals that are transmitted across a network medium.

Thus, the workflow begins with a host initiating a task. The TLS/SSL layer interface of the expansion card (acceleration network card) is called by the application, and the task is configured by the driver through the bus protocol interface. Next, a "protocol offload control" unit on the expansion card enables the corresponding protocol offloading process according to the interface called by the host. Following this, the TLS/SSL protocol layer on the expansion card starts the process control, which can be performed multiple times. If there is a computing task, arbitration is performed, and the computing task is distributed to the corresponding algorithm hardware acceleration unit until the calculation result is returned.

After this, the TCP/IP protocol stack processing unit on the expansion card encapsulates the encrypted data message by TCP/IP protocol and configures it to the network controller on the expansion card. The network controller then performs corresponding outgoing operation processing on the data side according to the setting of the control side thereof.

As shown in FIG. 6(b), method 660 begins at 662 where the network controller receives a data packet from the network, forms an incoming IP communication from the data packet, and sends the incoming IP communication to the processor on the expansion card by way of the internal bus. In the TCP/IP context, the network controller of the expansion card receives frames from the remote host by way of the network medium, and converts the frames into IP datagrams.

Method 660 next moves to 664 where the processor on the expansion card processes the transport layer protocol stack to generate processed data from the incoming IP communication. In the TCP/IP context, the processor on the expansion card processes the IP datagrams through the TCP/IP protocol stack to obtain data segments. In addition, the processor on the expansion card can execute the TCP/IP protocol stack or, in the case where there is a TCP offload engine (TOE) in the expansion device, the hardware acceleration processing of the network protocol (TCP/IP) is performed using the TCP offload engine (TOE).

After this, method 660 moves to 666 where the processor on the expansion card determines whether the data segments require decryption, such as TLS/SSL decryption. When decryption is required, method 660 processes the security protocol to generate decrypted data from the processed data. The processor on the expansion card processes the TLS/SSL protocol stack, and method 660 moves to 672 where the processor on the expansion card performs arbitration, and then to 674 to perform the calculation tasks for decryption.

When the processed data does not required decryption, or after the decrypted data has been formed, method 600 moves to 676 where the processor on the expansion card sends the processed data to the application running on the host processor by way of the external bus when the processed data is not encrypted, and the decrypted data to the application running on the host processor by way of the external bus when the processed data was encrypted.

Thus, the workflow begins with the expansion card receiving a data message. After this, a network controller on the expansion card transmits the corresponding data to the TCP/IP protocol for a parsing process, which can be performed multiple times. Next, if the data obtained after parsing is unencrypted, it is sent directly to the host application through a "protocol offloading control unit" of the expansion card.

If the data is encrypted, the TLS/SSL protocol layer on the expansion card starts parsing, and the computing task is arbitrated and distributed to the corresponding algorithm hardware acceleration unit until the calculation result is returned. The decrypted plaintext data is then sent to the host application through the "protocol offloading control unit."

As can be seen from the above steps, in the TLS/SSL full offloading solution proposed in the present application, the expansion card completes almost all of the processes under the TLS/SSL protocol layer, and can significantly reduce the computing pressure on the host. In addition, for the entire process including the host, one of the advantages of the present invention is that it can avoid having all traffics pass through the host. As a result, the CPU resource of the host will no longer be spent on network transmission related steps such as TCP/IP protocol stack and protocol layer parsing of TLS/SSL.

Another advantage of the present invention is that in the data path of each data transmission/reception, the number of driver interface calls between the host and the expansion card is significantly reduced. That is, the number of bus protocol interface communications, corresponding kernel state/user state switching, are reduced. A further advantage of the present invention is that the architecture of "host+ acceleration network card" enables the host's resources to be allocated more to the application. The host bus interface side only needs to process the plaintext data, which relieves the bus bandwidth pressure, simplifies the data processing flow, and avoids additional resource consumption and delay cost.

According to one or more embodiments of the present application, an embodiment of the method for offloading an algorithm is further provided. This method is used in the process of a server host that performs data transmission based on the HTTPS protocol receiving data from a web browser; the embodiment may be applied to the system for offloading an algorithm as described with respect to offload servers 300 and 400, including, but not limited to the scenario mentioned with respect to offload servers 300 and 400. It should be noted that the steps shown in the flowchart of the accompanying drawings may be executed by a computer system such as a set of computer executable instructions, and, although the logical order is shown in the flowchart, in some cases, the steps shown or described may be performed in an order different from that which is shown herein.

Figure 7A:
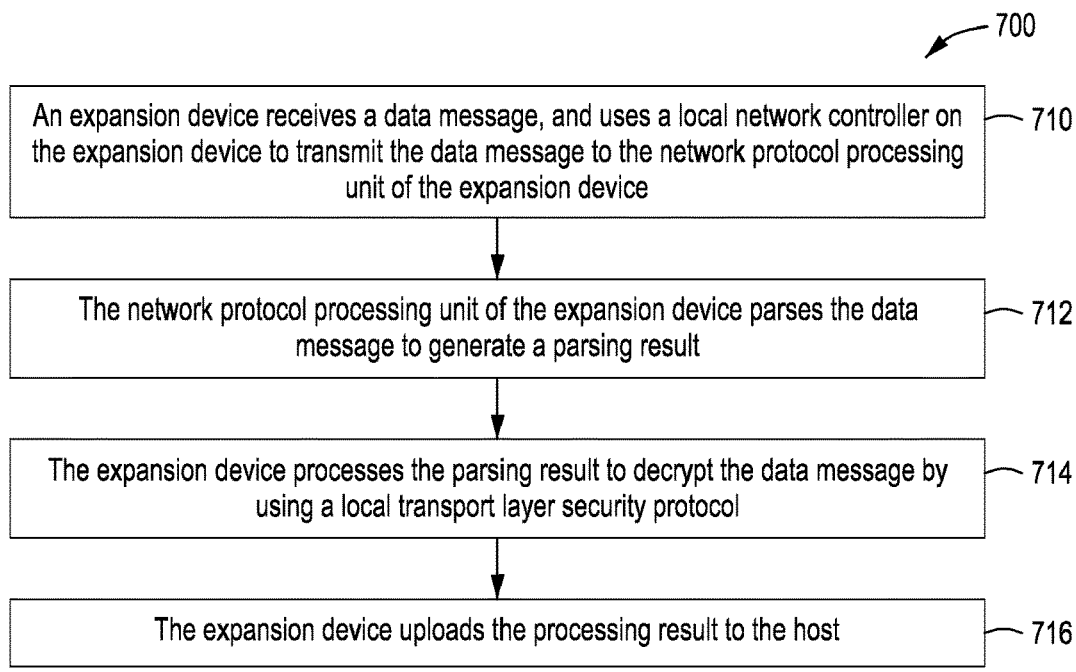
FIGS. 7(a)-7(e) are flow charts illustrating offloading methods in accordance with the present invention.
Figure 7B:
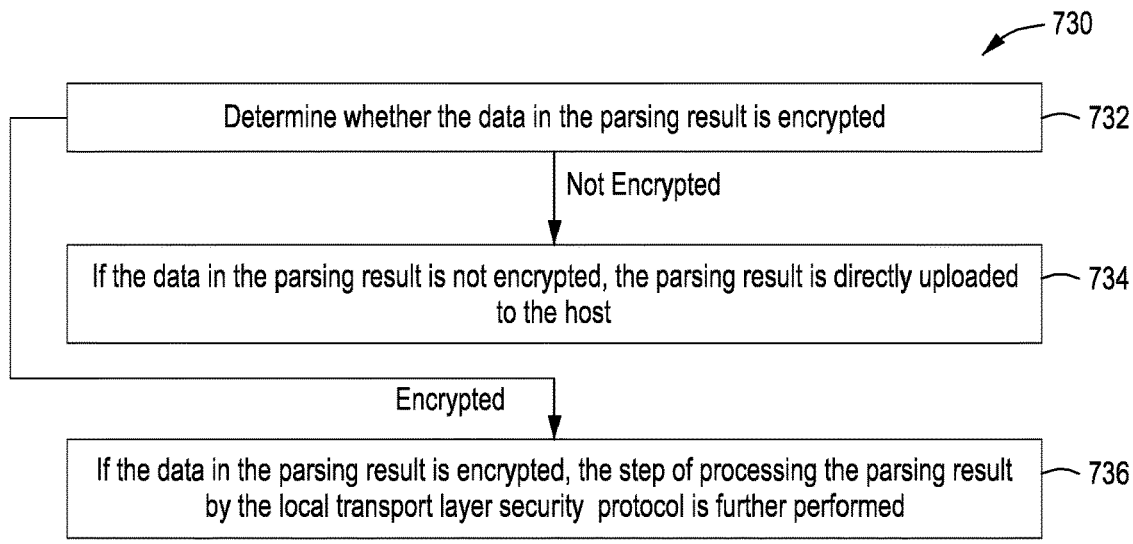
Figure 7C:
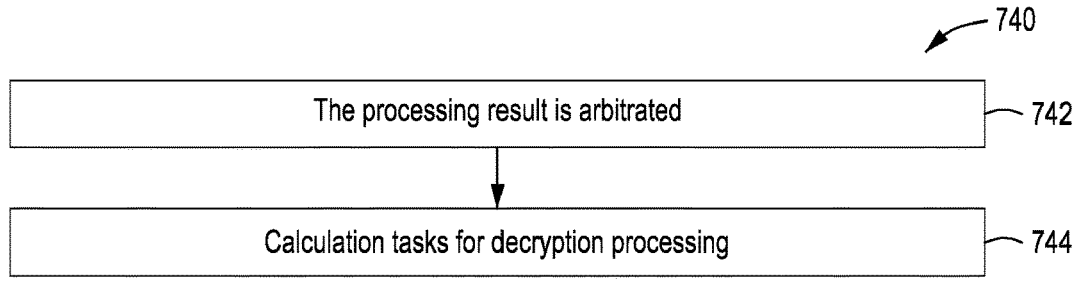
Figure 7D:
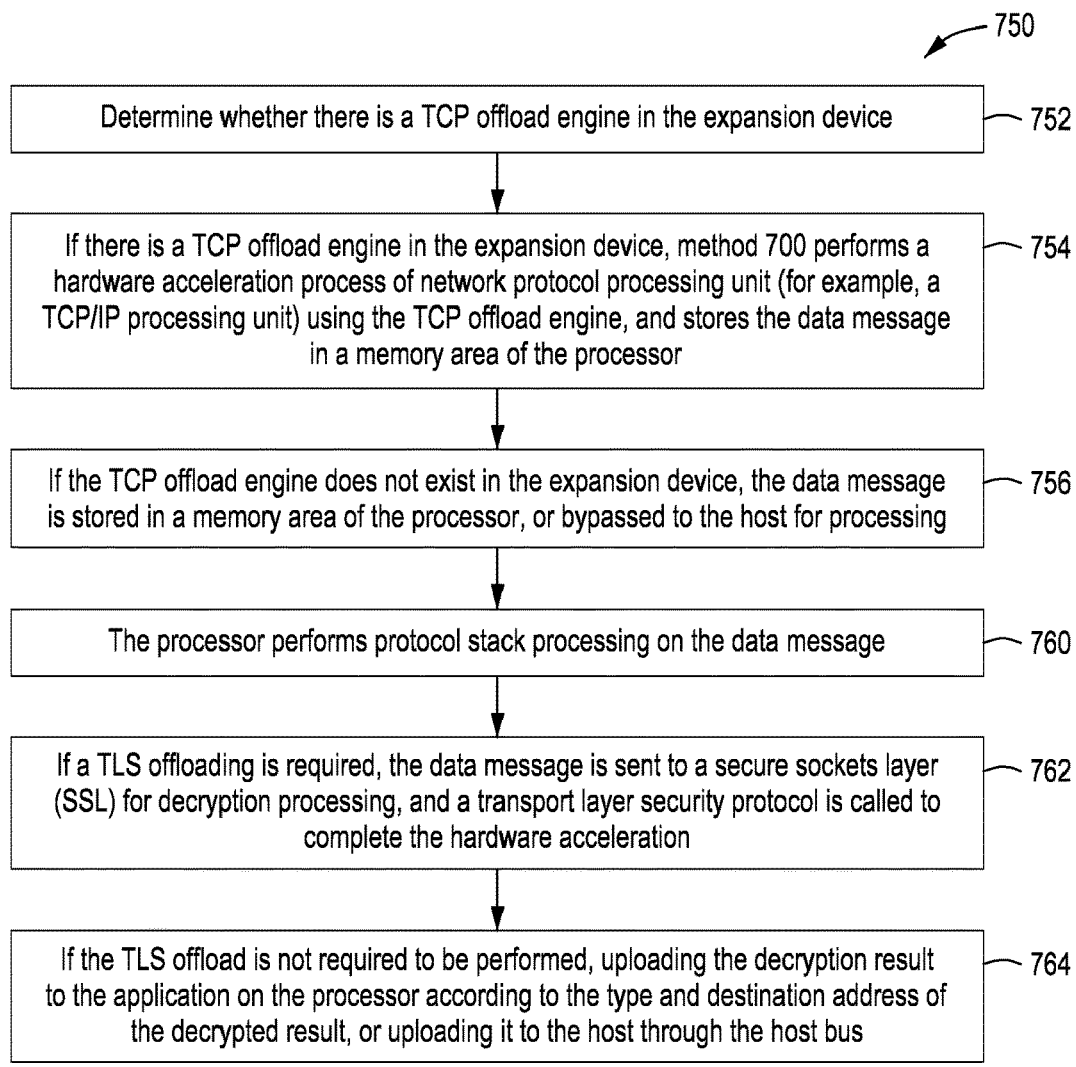
Figure 7E:
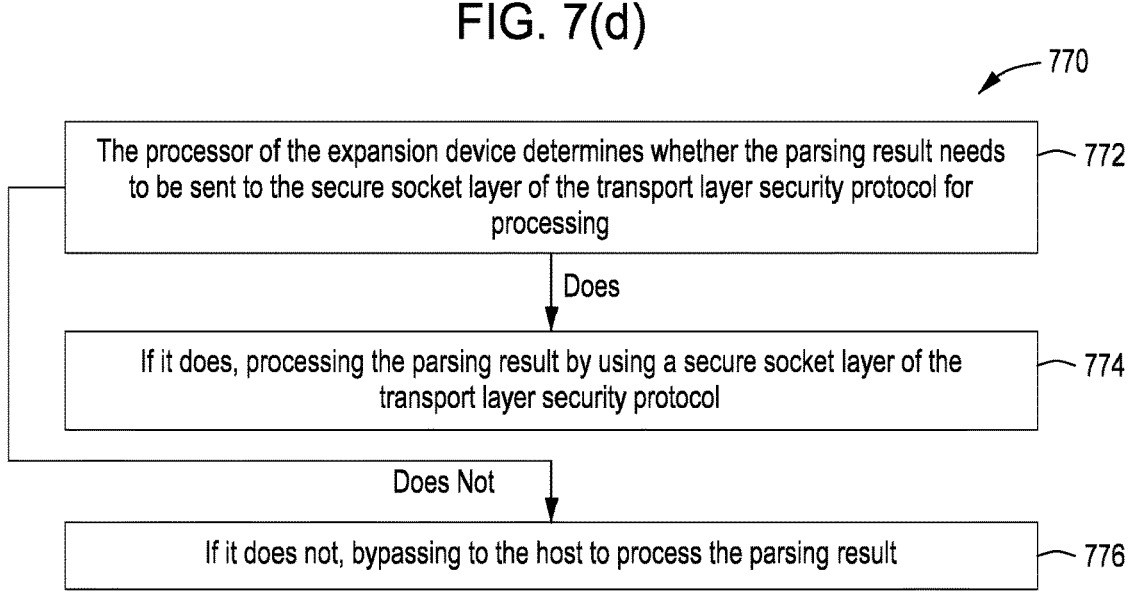

FIGS. 7(a)-7(e) show flow charts that illustrate offloading methods in accordance with the present invention. FIG. 7(a) shows a flow chart that illustrates an example of an offloading method 700. FIG. 7(b) shows a flow chart that illustrates an example of a method 730 included within step 712 in accordance with the present invention. FIG. 7(c) shows a flow chart that illustrates an example of a method 740 included within step 714 in accordance with the present invention. FIG. 7(d) shows a flow chart that illustrates an example of a method 750 included within step 710 in accordance with the present invention. FIG. 7(e) shows a flow chart that illustrates an example of a method 770 included within step 712 in accordance with the present invention.

As shown in FIG. 7(a), method 700 begins at 710 where an expansion device receives a data message, and uses a local network controller on the expansion device to transmit the data message to the network protocol processing unit of the expansion device for parsing. Method 700 next moves to 712 where the network protocol processing unit of the expansion device parses the data message to generate a parsing result. Following this, method 700 moves to 714 where the expansion device processes the parsing result by using a local transport layer security protocol. After this, method 700 moves to 716 where the expansion device uploads the processing result to the host.

Specifically, in the foregoing step, when the server host receives data from the web browser, the host is used to receive data. At this time, an expansion device independent from the host (that is, TLS/SSL full offloading hardware acceleration network card) receives a data message, transmits the corresponding data to the TCP/IP protocol for parsing through the network controller on the expansion device, and then processes the parsing result by using a transport layer security protocol (TLS/SSL) on the expansion device. The expansion device next uploads the processing result to the host (that is, the server host).

The parsing operations performed by the TLS/SSL protocol layer (that is, the transport layer security protocol layer) on the expansion device include, but are not limited to, arbitrating the computation task and dispatching it to the corresponding algorithm hardware acceleration unit until the calculation result is returned. Depending on the situation, the foregoing step may be performed multiple times.

As can be seen from the above, in the above embodiment of the present application, the server host receives the data from the web browser. An expansion device is then used to receive the data message. The expansion device next uses a network protocol processing unit inside the expansion device (for example, a TCP/IP processing unit) to perform TCP/IP parsing to obtain a data message.

Following this, the expansion device obtains the parsing result, processes the parsing result using the transport layer security protocol (TLS/SSL) of the expansion device, and uploads the processing result to the host (that is, the server host). In this way, the present invention achieves the goal of allowing the expansion card to complete almost all of the processes under the TLS/SSL protocol layer, thereby reducing the computational pressure on the host, providing more computing resources for the application.

At the same time, the technical effect of delay and throughput in the secure network protocol is ensured by means of parallel computing kernels on the expansion card, thereby solving the technical problem that the resource occupation of the server host is still very large due to the solution of using only local hardware offloading in the prior art.

FIG. 7(b) shows a flow chart that illustrates an example of a method 730 included within step 712 in accordance with the present invention. As shown in FIG. 7(b), method 730 begins at 732 where, after the data message has been parsed by the network (TCP/IP) protocol processing unit to obtain the parsing result, method 730 determines whether the data in the parsing result is encrypted. Next, method 730 moves to 734 where, if the data in the parsing result is not encrypted, the parsing result is directly uploaded to the host. Alternately, method 700 moves to 736 where, if the data in the parsing result is encrypted, method 730 moves to 714.

Specifically, in the foregoing embodiment, after the data message is transmitted to the network (TCP/IP) protocol processing unit for parsing by the local network controller, it is determined whether the parsing data is encrypted. If it is not encrypted, it will be sent directly to the host application through the "protocol offloading control unit." If the data is encrypted, the TLS/SSL protocol layer on the expansion card begins to parse the data, and the computing task is arbitrated and distributed to the corresponding algorithm hardware acceleration unit until the calculation result is returned.

FIG. 7(c) shows a flow chart that illustrates an example of a method 740 included within step 714 in accordance with the present invention. As shown in FIG. 7(c), method 740 begins at 742 where, after it has been determined that the data in the parsing result is encrypted, method 740 begins at 742 where the processing result is arbitrated, and then moves to 744 where the arbitrated processing result is sent to the corresponding algorithm acceleration unit for decryption processing so as to obtain a decryption result. Through the above embodiment, the algorithm acceleration unit is used to perform decryption processing, and the hardware acceleration can be achieved.

Optionally, on the expansion device, the software stack may be used to run the service of the transport layer security protocol. The engine unit of the transport layer security protocol is then used to perform offloading the encryption and decryption algorithm. The hardware acceleration processing of network protocol (TCP/IP) is performed by a TCP offload engine (TOE).

FIG. 7(d) shows a flow chart that illustrates an example of a method 750 included within step 710 in accordance with the present invention. As shown in FIG. 7(d), method 750 begins at 752 where, before the data message is send to the network protocol processing unit, method 750 determines whether there is a TCP offload engine in the expansion device. Next, if there is a TCP offload engine in the expansion device, method 750 moves to 754 to perform a hardware acceleration process of network protocol processing unit (for example, a TCP/IP processing unit) using the TCP offload engine, and store the data message in a memory area of the processor.

Alternately, if there is no TCP offload engine in the expansion device, method 750 moves to 756 where the data message is stored in a memory area of the processor, or bypassed to the host for processing.

After the data message is stored in the memory area of the processor, method 750 moves to 760 where the processor performs protocol stack processing on the data message. Next, method 750 moves to 762 where, if a TLS offloading is required, the data message is sent to a secure sockets layer (SSL) for decryption processing, and a transport layer security protocol is called to complete the hardware acceleration. Alternately, method 750 moves to 764 where, if the TLS offload is not required to be performed, uploading the decryption result to the application on the processor according to the type and destination address of the decrypted result, or uploading it to the host through the external bus.

In an optional embodiment, in the process of processing the parsing result by using the secure socket layer of the transport layer security protocol, the TCP offload engine uses the transport layer encryption device to encrypt and decrypt the data by means of calling the driver thereof. If the encryption and decryption result satisfies a predetermined condition, the data is then uploaded to the host.

In an optional embodiment, in the process of processing the parsing result by using the secure socket layer of the transport layer security protocol, the TCP offload engine uses a transport layer encryption device to decrypt the data by means of calling the driver thereof according to the type of the decrypted result. According to the type and destination address of the decryption result, the decryption result is uploaded to the application on the processor, or uploaded to the host through the host bus.

FIG. 7(e) shows a flow chart that illustrates an example of a method 770 included within step 712 in accordance with the present invention. As shown in FIG. 7(e), method 770 begins at 772 where, after the data message has been parsed by the network (TCP/IP) protocol processing unit to obtain the parsing result, method 770 determines whether the parsing result needs to be sent to the secure socket layer of the transport layer security protocol for processing.

Following this, method 770 moves to 774 where, if the parsing result needs to be sent to the secure socket layer, then method 770 processes the parsing result by using a secure socket layer of the transport layer security protocol. Alternately, method 770 moves to 776 where, if the parsing result does not need to be sent to the secure socket layer, then method 776 bypasses to the host to process the parsing result.

Figure 8:
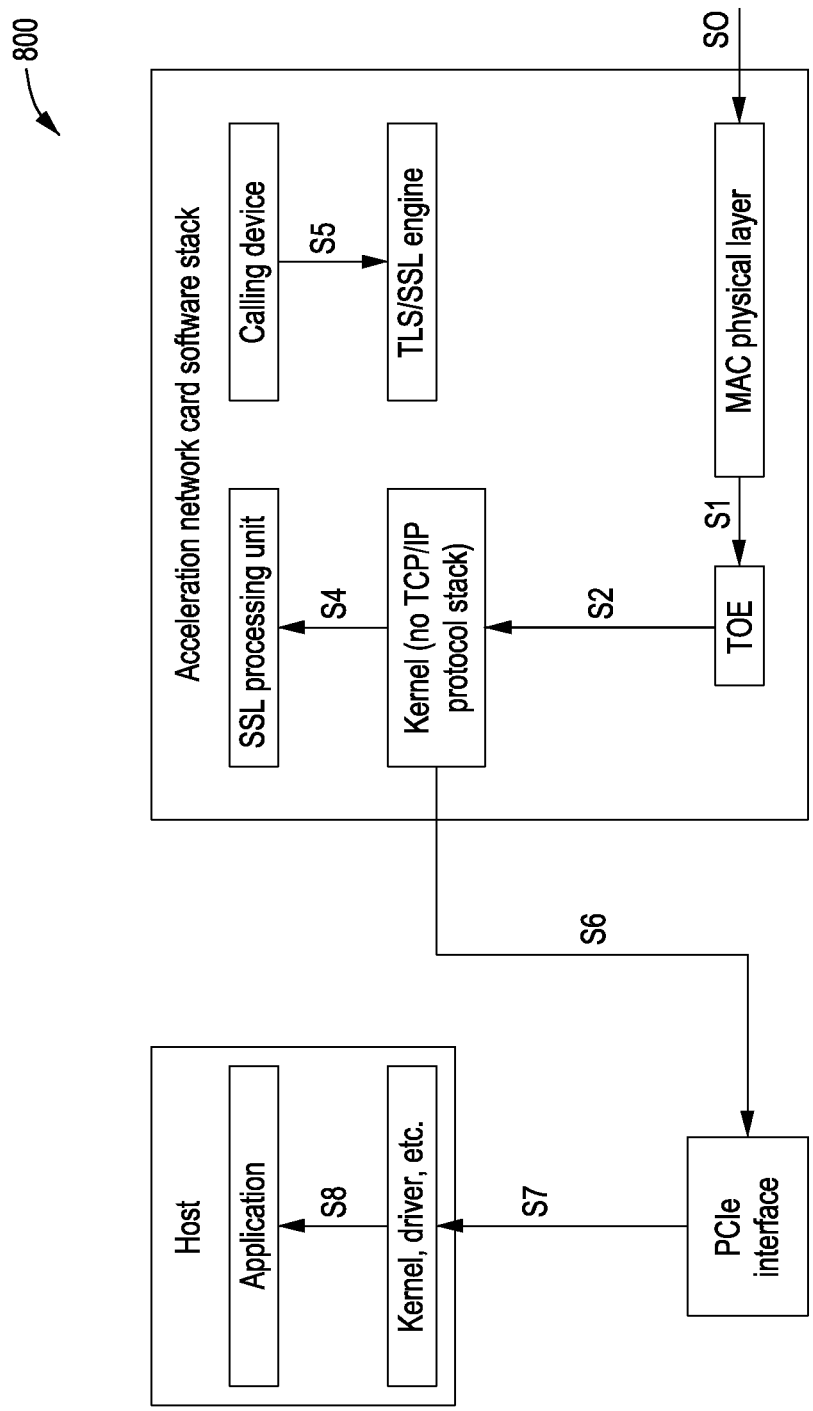
FIG. 8 is a diagram illustrating an example of a method 800 of operating an offload server in accordance with one or more embodiments of the present invention.

FIG. 8 shows a diagram that illustrates an example of a method 800 of operating an offload server in accordance with one or more embodiments of the present invention. As shown in FIG. 8, in an offload protocol mode, a host runs an HTTP network service application program such as Apache, and the expansion card handles all of the network-related protocol control and data processing. The software stack on the expansion card can be implemented in the form of "ARM processor+Linux operating system." On the expansion card, the TLS/SSL protocol layer service is performed by the software stack, the hardware acceleration processing of the TCP/IP protocol stack is performed by a TOE unit, and the encryption and decryption algorithm offload is performed by the TLS/SSL engine.

As further shown in FIG. 8, after receiving a data message (S0), a MAC processes the data via a TOE (S1). The processed data is stored in a memory area of ARM (S2), and the ARM kernel processes the data of the TOE. The data received by the ARM kernel is at the TLS/APP layer. According to the protocol and the preset condition, it determines whether the data packet should be handed over to SSL for processing (S4), or bypassed to the host when decryption is not required (S6).

If the data packet is to be processed by SSL, method 800 calls the setting to TLS engine hardware through libcrypto and a user mode driver (S5). If the processed data is session data, it is uploaded to the host (S6). Following this, write the PCIe DMA to the memory area of the host, and provide an interrupt (S7).

When there is a TOE, the kernel of the expansion card running on ARM does not need to process the TCP/IP protocol stack. Rather, it only needs to encapsulate the interface and data of the TOE module into various operation functions of the socket interface, which is convenient for other processes to call. In addition, after the PCIe DMA is written to the host memory area, it should use an asynchronous mode to guarantee the throughput rate while waiting for the host to respond to the interrupt. The host can use a form similar to ring buffer to complete the reception. Further, when the host sends a message, the path is the opposite, while the process and the idea are similar. This embodiment works in the context of most common server applications.

Figure 9:
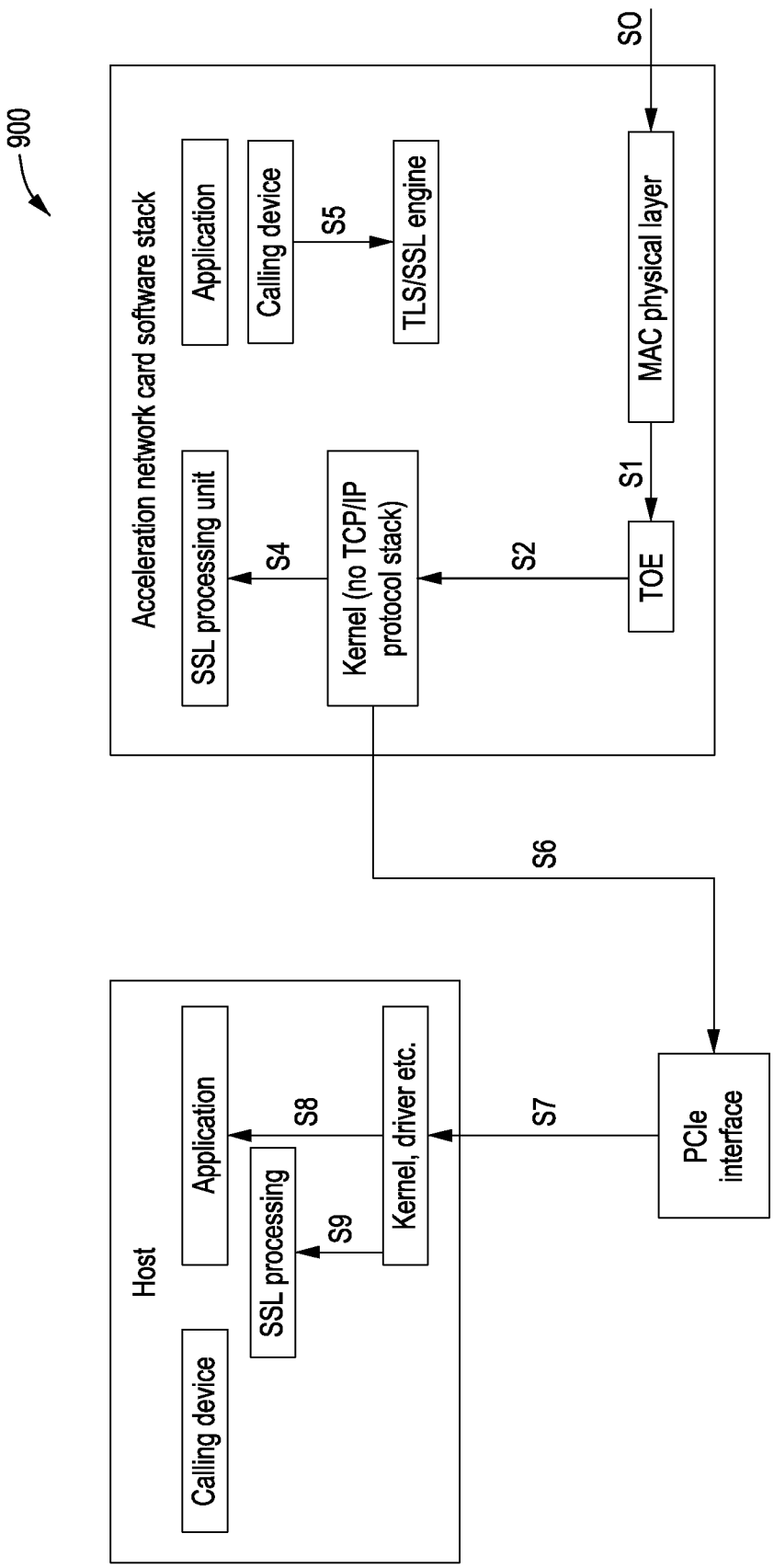
FIG. 9 is a diagram illustrating an example of a method 900 of operating an offload server in accordance with one or more embodiments of the present invention.

FIG. 9 shows a diagram that illustrates an example of a method 900 of operating an offload server in accordance with one or more embodiments of the present invention. As shown in FIG. 9, in a mixed mode of host and acceleration network card offloading protocol in the presence of TOE, there can be a number of demands in some server application scenarios. One of the demands is that some lightweight applications can also be offload to the expansion card, and the benefit is to reduce processing delay. Another demand is that sometimes a small number of applications on the host will directly call a lower layer interface of openSSL without hardware offload for TLS/SSL.

Therefore, when the host runs the HTTP network service application, it also needs to include the TLS/SSL protocol layer related runtime library (only in a few cases does it need to be called). The expansion card handles all of the network related protocol control and data processing, as well as a lightweight application. The software stack on the expansion card can still be implemented in the form of "ARM processor+Linux operating system." On the expansion card, the TLS/SSL protocol layer service is performed by the software stack. The hardware acceleration processing of the TCP/IP protocol stack is performed by a TOE unit, and the encryption and decryption algorithm offload is performed by the TLS/SSL engine.

As further shown in FIG. 9, after receiving a data message (S0), a MAC processes the data via a TOE (S1). The processed data is stored in a memory area of an ARM, and the ARM kernel processes the data of the TOE (S2). The data received by the ARM kernel is at the TLS/APP layer. According to the protocol and the preset condition, it determines whether the data packet should be handed over to SSL for processing (S4), or bypassed to the host when no decryption is required (S6).

If it is to be processed by SSL (S4), method 900 calls the setting to TLS engine hardware through libcrypto and a user mode driver (S5). According to the type and destination address of the processed data, method 900 sends the processed data to the application on the ARM (through interprocess communication), or uploads the processed data to the host through the host bus interface (S6). Following this, method 900 writes the PCIe DMA to the memory area of the host, and provides an interrupt (S7).

When there is a TOE, the kernel of the expansion card running on ARM does not need to process the TCP/IP protocol stack. Rather it only needs to encapsulate the interface and data of the TOE module into various operation functions of the socket interface, which is convenient for other processes to call. In addition, after the PCIe DMA is written to the host memory area, it should use asynchronous mode to guarantee the throughput rate while waiting for the host to respond to the interrupt. The host may use a form similar to ring buffer to complete the reception. Further, when the host sends a message, the path is the opposite, while the process and the idea are similar.

Figure 10:
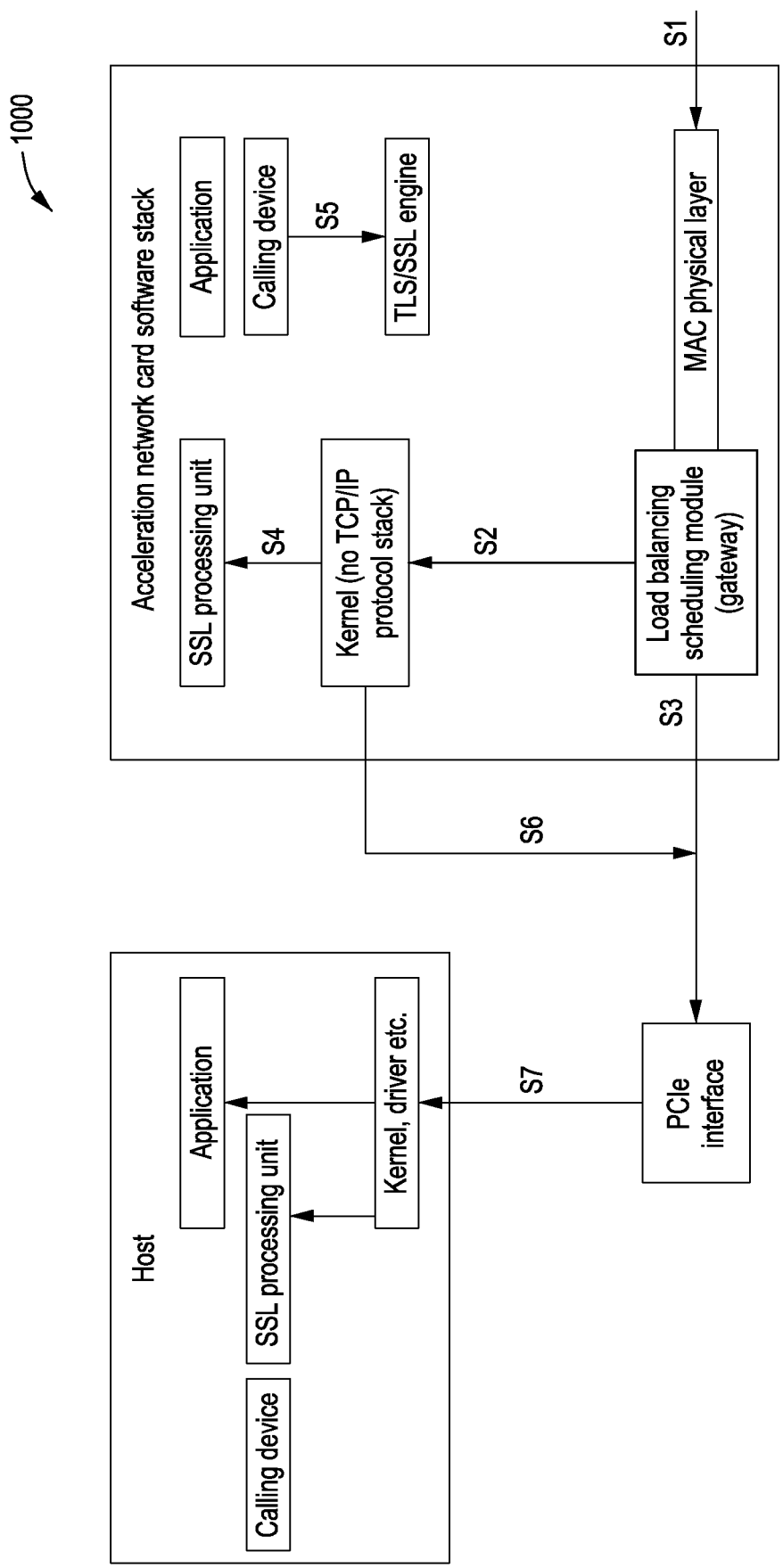
FIG. 10 is a diagram illustrating an example of a method 1000 of operating an offload server in accordance with one or more embodiments of the present invention.

FIG. 10 shows a diagram that illustrates an example of a method 1000 of operating an offload server in accordance with one or more embodiments of the present invention. As shown in FIG. 10, in a mixed mode of host and acceleration network card offloading protocol in the absence of TOE, for some types of expansion cards, considering the reasons of cost, design complexity, and so on, the TOE hardware module is not included in the expansion card. In this case, a part of the ARM processor resources on the expansion card will be allocated to the TCP/IP protocol stack parsing. It is also necessary to consider that in the situation where the processing resources of the expansion card are saturated, a bypass unit may be added.

The workflow in the mixed protocol mode without TOE module will be described in this embodiment. Therefore, when the host runs the HTTP network service application, it may also need to include the TLS/SSL protocol layer related runtime library (only in a few cases does it need to be called). The expansion card handles all network related protocol control and data processing, as well as a lightweight application program. The software stack on the expansion card can still be implemented in the form of "ARM processor+Linux operating system."

On the expansion card, the TLS/SSL protocol layer and the TCP/IP protocol stack are run through the software stack, and the encryption and decryption algorithm is offload by the TLS/SSL engine. Because ARM will become the bottleneck of system traffic when the traffic of the network port increases (such as the line speed), it is necessary to distinguish between a number of traffics.

The first is Normal HTTPS traffic. This part of the traffic is characterized in that it is initiated by the client, which will be preferably handed over to the TLS/SSL offload on ARM. When the ARM kernel resource usage exceeds a certain level, some new traffic will be bypassed to PCIe, and thus handled directly by the host. The second is Mixed HTTP and other unrelated traffic. This part is generally not supposed to enter the ARM TLS/SSL offload module, and they thus may be bypassed to the host or discarded.

The third is traffics required by HTTP and other protocols, and other ports. This part includes the network detection and certificate chain verification, and so on. This part of the traffic may be initiated by ARM or by other devices in a sub-net. Therefore, it is necessary to distinguish their individual originating source and returning address so as to ensure the respective network processes and state control of ARM and host. Therefore, when there is no TOE module, a bypass module is needed to divert the traffic unrelated to ARM to the host, and filter according to the bypassing rules configured by the ARM.

As further shown in FIG. 10, after receiving a data message, a MAC sends the data message to a bypass unit for offloading (S1). The data is stored in the memory area of the ARM (S2), or bypass the data to the PCIe to upload to the host (S3). The data received by the ARM kernel is first processed by the protocol stack. If the data packet requires hardware offloading of TLS, it is handed over to the SSL for processing (S4), and the subsequent process context state and the decrypted data will be uploaded to the host (S6).

If the data are processed by SSL, method 1000 calls TLS/SSL for hardware acceleration via libcrypto and user mode driver (S5). According to the type and destination address of the processed data, method 1000 sends the processed data to the application on the ARM (through inter-process communication), or uploads the processed data to the host through the host bus interface (S6). Next, method 1000 writes the PCIe DMA to the memory area of the host, and provides an interrupt S(7).

In the case where there is no TOE, the ARM kernel needs to handle the TCP/IP stack. In addition, after the PCIe DMA is written to the host memory area, it should use asynchronous mode to guarantee the throughput rate while waiting for the host to respond to the interrupt. The host may use a form similar to ring buffer to complete the reception. Further, when the host sends a message, the path is the opposite, while the process and the idea are similar.

It should be noted that the present application proposes a method for full offloading the part under the TLS/SSL protocol layer. In a specific implementation, there may be multiple different specific forms. For example, ARM kernel intelligent network card+TLS/SSL hardware acceleration module+TOE.

The technical solution proposed by the present application completely offloads the process under the TLS/SSL protocol layer, and adopts the redesigned structure that includes the following three levels: "protocol offload," "computing task arbitration" and "basic network control" on the expansion card. This solves the pain point of "cost compromise" associated with the traditional TLS/SSL protocol partial offload.

It can be seen that in the TLS/SSL full offloading solution proposed by the present application, the computing pressure on the host is significantly reduced, more computing resources are provided for the application, and the delay and throughput in the network security protocol is ensured by the parallel computing kernels.

Figure 11:
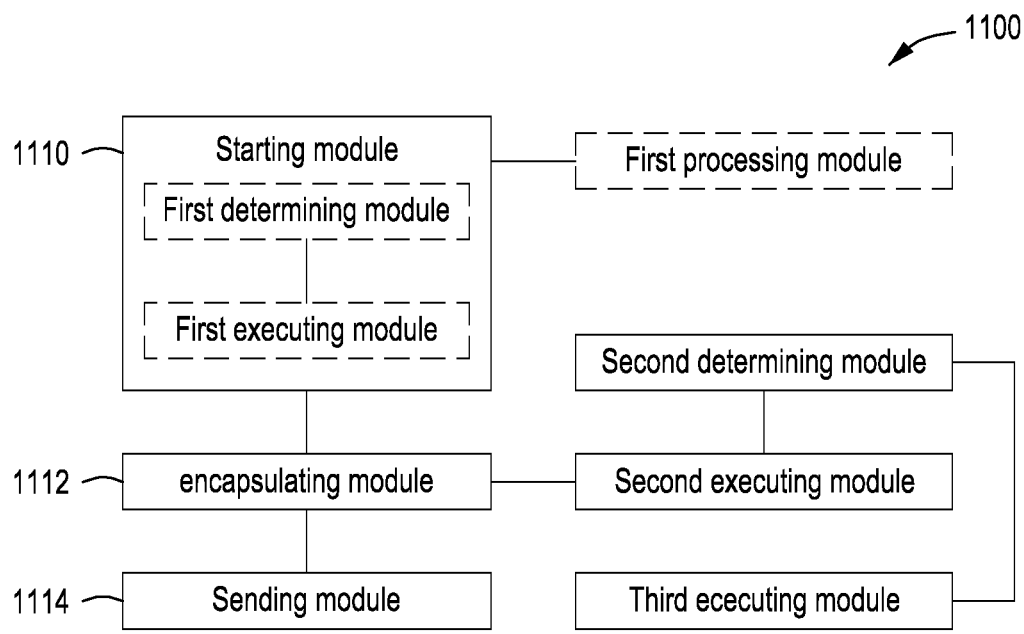
FIG. 11 is a block diagram illustrating an example of a device 1100 for offloading an algorithm in accordance with one or more embodiments of the present invention.

FIG. 11 shows a block diagram that illustrates an example of a device 1100 for offloading an algorithm in accordance with one or more embodiments of the present invention. As shown in FIG. 11, device 1100, which can execute methods 500, 600 and 660, includes a starting module 1110, an encapsulating module 1112, and a sending module 1114. Starting module 1110 starts a local transport layer security protocol to process a task through an expansion device according to an interface called by a host. Encapsulating module 1112 encapsulates the processing result as a data message after the transport layer security protocol processing the task through the expansion device by means of using a network protocol processing unit.

Sending module 1114 sends out the encapsulated data message through a network controller deployed in the expansion device. Starting module 1110, encapsulating module 1112, and sending module 1114 can be used to implement elements 510 to 514 in FIG. 5(a). The examples and application scenarios implemented by the foregoing modules and the corresponding steps are the same, which include but are not limited to the content disclosed with respect to method 500. It should be noted that the above modules may be implemented as part of a device in a computer system such as a set of computer executable instructions.

It can be seen from the above that in the foregoing embodiment of the present application, in the process of sending data to the web browser by the server host, the expansion device starts the local transport layer security protocol (TLS/SSL) according to the interface called by the host to process the task related to the host sending data. After the transport layer security protocol (TLS/SSL) processes the related tasks, the network protocol processing unit inside the expansion device is further used to perform TCP/IP encapsulation for the processing result as a data message.

Finally, the network controller deployed in the expansion device sends out the encapsulated data message so that the expansion card completes almost all the processes under the TLS/SSL protocol layer, thereby reducing the computational pressure on the host. More computing resources are thus provided for the application, and the technical effects of delay and throughput in the secure network protocol are ensured by the parallel computing kernel on the expansion card, thereby solving the technical problem of the local hardware offloading solution employed in the prior art that the resource usage on the server host is still relatively large.

In an optional embodiment, device 1100 further includes a first processing module, which initiates a task through a host, and calls an interface of the transport layer security protocol of an expanded device through an application of the host so that the expansion device can perform the functions of transport layer security protocol algorithms, network protocol encapsulation, and the functionality of the underlying network protocol stack for the task.

It should be noted herein that the foregoing first processing module corresponds to element 522, and the examples and application scenarios implemented by the foregoing module and the corresponding step are the same, which include but are not limited to the content disclosed with respect to method 520. It should be noted that the above modules may be implemented as part of a device in a computer system such as a set of computer executable instructions.

In an optional embodiment, the foregoing starting module includes: a first determining module, which is configured to determine whether a transport layer security protocol is required to process the task; and a first executing module, which is configured, if necessary, to arbitrate the task and send the task to an algorithm acceleration unit for processing, so as to obtain the processing result of the task.

It should be noted that the first determining module and the first executing module correspond to elements 532 and 534 of method 530. The examples and application scenarios implemented by the foregoing modules and the corresponding steps are the same, which include but are not limited to the content disclosed with respect to method 530. It should be noted that the above modules may be implemented as part of a device in a computer system such as a set of computer executable instructions.

In an optional embodiment, the foregoing encapsulating module is further configured to encapsulate the processing result through a network protocol processing unit, and configure the encapsulating result to a network controller. In an optional embodiment, on the expansion device, the software stack is used to run the service of the transport layer security protocol, the engine unit of the transport layer security protocol is used to perform offloading the encryption and decryption algorithm, and the TCP offload engine is used to perform the hardware accelerated processing of the network protocol.

In an optional embodiment, the foregoing device further includes: a second determining module, which is configured to determine whether a TCP offload engine exists in the expansion device; and a second executing module, which is configured to, if it exists, execute the hardware accelerated processing of a network protocol through the TCP offload engine.

It should be noted that the foregoing second determining module and the second executing module correspond to elements 542 and 544 of method 540. The examples and application scenarios implemented by the foregoing modules and the corresponding steps are the same, which include but are not limited to the content disclosed with respect to method 540. It should be noted that the above modules may be implemented as part of a device in a computer system such as a set of computer executable instructions.

In an optional embodiment, device 1100 further includes a third executing module which, if the TCP offload engine does not exist, determines whether the resource usage of the expansion device exceeds a predetermined threshold. If so, the third executing module uses a load balancing scheduling module (or "traffic scheduling module") to bypass a part of the traffic to the host for processing.

It should be noted that the foregoing third executing module corresponds to element 546 in method 540. The examples and application scenarios implemented by the foregoing module and the corresponding step are the same, which include but are not limited to the content disclosed with respect to method 540. It should be noted that the above modules may be implemented as part of a device in a computer system such as a set of computer executable instructions.

Figure 12:
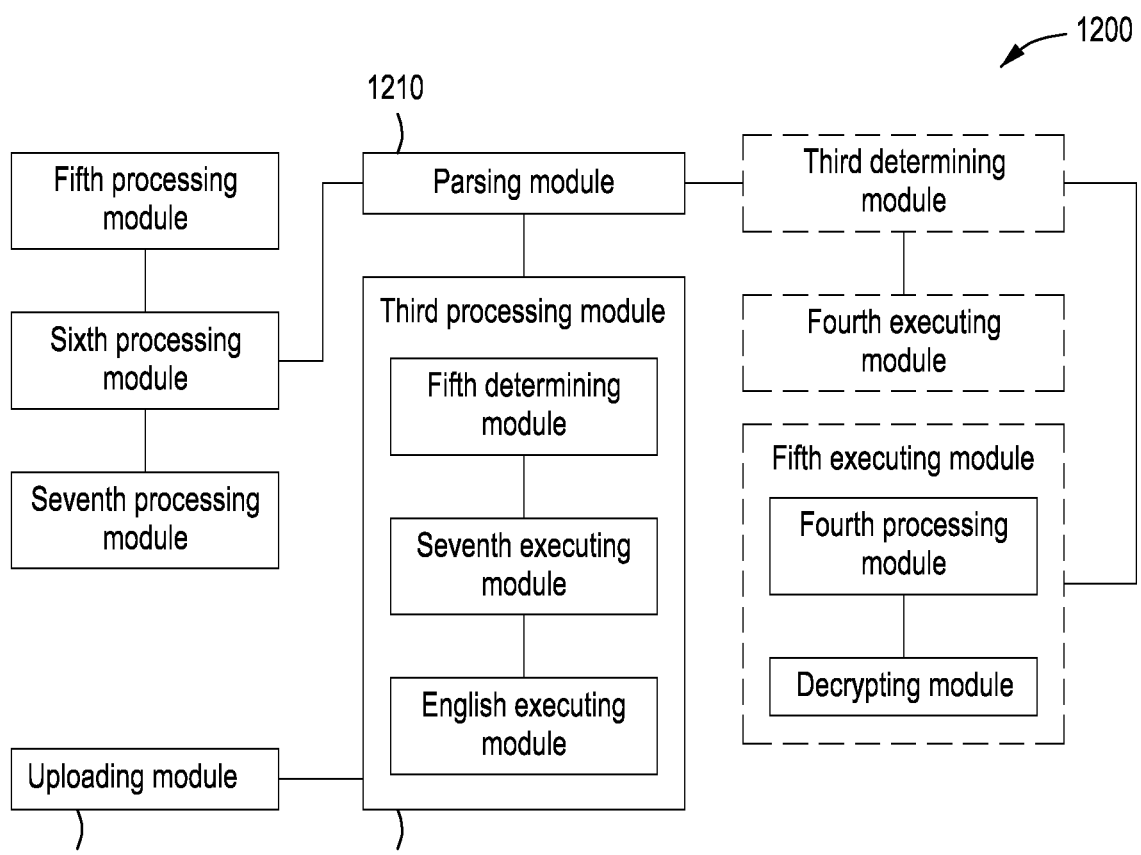
FIG. 12 is a block diagram illustrating an example of a device 1200 for offloading an algorithm according to one or more embodiments of the present invention.

FIG. 12 shows a block diagram that illustrates an example of a device 1200 for offloading an algorithm according to one or more embodiments of the present application. As shown in FIG. 12, device 1200, which can execute methods 700, 730, 740, 750, and 770, includes a parsing module 1210, a third processing module 1212, and an uploading module 1214. Parsing module 1210 receives a data message through an expansion device, and uses a local network controller to send the data message to a network protocol processing unit for parsing. Third processing module 1212 processes the parsing result through the expansion device by means of a local transport layer security protocol. Uploading module 1214 uploads the processing result to the host through the expansion device.

Parsing module 1210, third processing module 1212, and uploading module 1214 correspond to elements 710 to 716 of method 700. The examples and application scenarios implemented by the foregoing modules and the corresponding steps are the same, which include but are not limited to the content disclosed with respect to method 700. It should be noted that the above modules may be implemented as part of a device in a computer system such as a set of computer executable instructions.

It can be seen from the above that in the foregoing embodiment of the present application, in the process of receiving the data sent from the web browser by the server host, the expansion device receives a data message and performs TCP/IP parsing with the processing result as the data message by using a network protocol processing unit (for example, a TCP/IP processing unit) inside the expansion device so as to obtain the parsing result In addition, the expansion device uses an expansion device local transmission layer security protocol (TLS/SSL) to process the parsing result, and uploads the processing result to the host (that is, the server host) so that the expansion card completes almost all the processes under the TLS/SSL protocol layer, thereby reducing the computational pressure on the host.

More computing resources are thus provided for the application, and the technical effects of delay and throughput in the secure network protocol are ensured by the parallel computing kernel on the expansion card, thereby solving the technical problem of the local hardware offloading solution employed in the prior art that the resource usage on the server host is still relatively large.

In an optional embodiment, device 1200 further includes a third determining module which determines whether the data in the parsing result is encrypted, and a fourth executing module which, if the data in the parsing result is not encrypted, uploads the parsing result directly to the host. Device 1200 also includes a fifth executing module which, if the data in the parsing result is encrypted, performs the step of processing the parsing result by using the local transport layer security protocol.

It should be noted that the third determining module, the fourth executing module, and the fifth executing module correspond to elements 732 to 736 in method 730. The examples and application scenarios implemented by the foregoing modules and the corresponding steps are the same, which include but are not limited to the content disclosed in method 730. It should be noted that the above modules may be implemented as part of a device in a computer system such as a set of computer executable instructions.

In an optional embodiment, the fifth executing module includes a fourth processing module, which uses a transport layer security protocol layer to process the parsing result, and obtains a processing result. The fifth executing module also includes a decrypting module which arbitrates the processing result, and sends the data to the corresponding algorithm acceleration unit for encryption and decryption processing so as to obtain a decryption result.

It should be noted that the fourth processing module and the decrypting module correspond to elements 742 to 744 of method 740. The examples and application scenarios implemented by the foregoing modules and the corresponding steps are the same, which include but are not limited to the content disclosed in method 740. It should be noted that the above modules may be implemented as part of a device in a computer system such as a set of computer executable instructions.

In an optional embodiment, device 1200 further includes a fourth determining module, which determines whether a TCP offload engine exists in the expansion device, and a sixth executing module which, if a TCP offload engine exists in the expansion device, uses the TCP offload engine to execute the hardware acceleration processing of the network protocol processing unit (for example, a TCP/IP processing unit) and store the data message in the memory area of the processor.

It should be noted that the fourth determining module and the sixth executing module correspond to elements 752 and 754 of method 750. The examples and application scenarios implemented by the foregoing modules and the corresponding steps are the same, which include but are not limited to the content disclosed with respect to method 750. It should be noted that the above modules may be implemented as part of a device in a computer system such as a set of computer executable instructions.

In an optional embodiment, the third processing module includes a fifth determining module, which uses the processor of the extension device to determine whether the parsing result needs to be sent to the secure socket layer of the transport layer security protocol for processing. In addition, the third processing module includes a seventh executing module which, if the parsing result needs to be sent to the secure socket layer, processes the parsing result by using a secure socket layer of the transport layer security protocol. Further, the third processing module includes an eighth executing module which, if the parsing result does not need to be sent to the secure socket layer, bypasses to the host to process the parsing result.

It should be noted that the fifth determining module, the seventh executing module, and the eighth executing module correspond to elements 762 to 766 in method 760. The examples and application scenarios implemented by the foregoing modules and the corresponding steps are the same, which include but are not limited to the content disclosed with respect to method 760. It should be noted that the above modules may be implemented as part of a device in a computer system such as a set of computer executable instructions.

In an optional embodiment, the seventh executing module, when the secure socket layer of the transport layer security protocol is used to process the parsing result, uses a TCP offload engine to encrypt and decrypt the data through a transport layer encryption device by calling a driver thereof, and upload to the host if the encryption and decryption result satisfies a predetermined condition.

In an optional embodiment, the seventh executing module, when the secure socket layer of the transport layer security protocol is used to process the parsing result, uses a TCP offload engine to encrypt and decrypt the data through a transport layer encryption device by calling a driver thereof. According to the type and destination address of the decryption result, the decryption result is uploaded to the application on the processor, or uploaded to the host through the host bus.

In an optional embodiment, device 1200 further includes a ninth executing module which, in the case where a TCP offload engine does not exist in the expansion device, stores the data message in a memory area of the processor or bypass to the host for processing. The ninth executing module corresponds to 756 in method 750, and the examples and application scenarios implemented by the foregoing module and the corresponding steps are the same, which include but are not limited to the content disclosed with respect to method 750. It should be noted that the above module may be implemented as part of a device in a computer system such as a set of computer executable instructions.

In an optional embodiment, device 1200 further includes a fifth processing module, which performs protocol stack processing on the data message by the processor, and a sixth processing module which, if it is necessary to execute a TLS offload, sends it to a secure sockets layer (SSL) for decryption processing, and calls the transport layer security protocol to complete hardware acceleration.

It should be noted that the fifth processing module and the sixth processing module correspond to 760 and 762 of method 750, and the examples and application scenarios implemented by the foregoing modules and the corresponding steps are the same, which include but are not limited to the content disclosed with respect to method 750. It should be noted that the above modules may be implemented as part of a device in a computer system such as a set of computer executable instructions.

In an optional embodiment, device 1200 further includes a seventh processing module which, if the TLS offload does not need to be performed, uploads the decryption result to the application on the processor according to the type and destination address of the decryption result, or uploads it to the host through the host bus.

It should be noted that the seventh processing module described above corresponds to 764 in method 750, and the examples and application scenarios implemented by the foregoing module and the corresponding steps are the same, which include but are not limited to the content disclosed with respect to method 750. It should be noted that the above module may be implemented as part of a device in a computer system such as a set of computer executable instructions.

Figure 13:
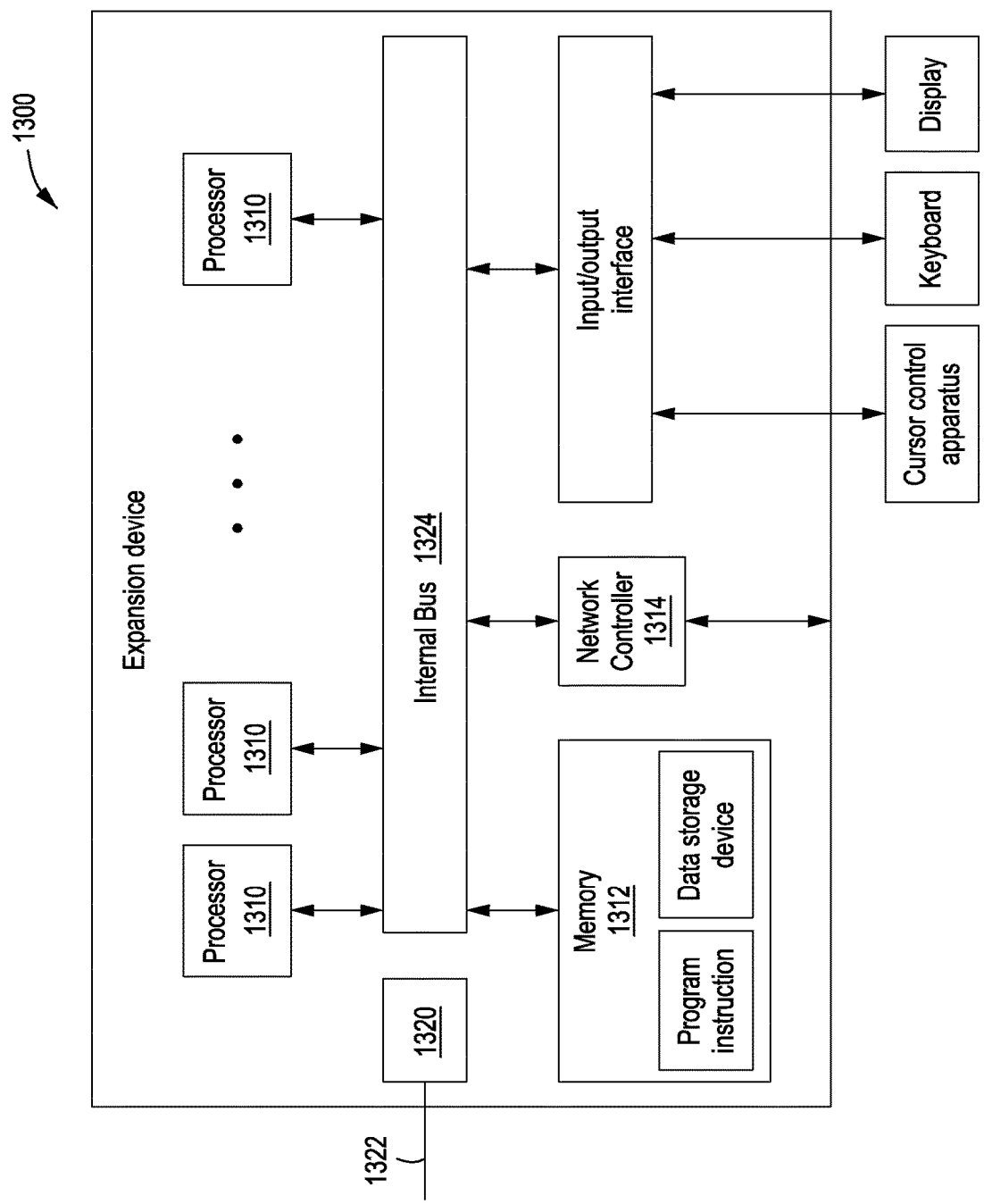
FIG. 13 is a block diagram illustrating an example of an expansion device 1300 in accordance with one or more embodiments of the present invention.

FIG. 13 shows a block diagram that illustrates an example of an expansion device 1300 in accordance with one or more embodiments of the present invention. As shown in the FIG. 13 example, expansion device 1300 includes a processor 1310 (multiple processors 1310 can alternately be used). Processor 1310 includes, but is not limited to, a processing device such as a microprocessor MCU or a programmable logic device FPGA.

In addition, expansion device 1300 includes a memory 1312 for storing data, a network controller 1314 for communication functions, and an external bus controller 1320 coupled to an external bus 1322. Further, expansion device 1300 includes an internal bus 1324 that is coupled to processor 1310, memory 1312, network controller 1314, and external bus controller 1320. External bus 1322, in turn, is coupled to a host processor.

In addition, expansion device 1300 can also include: a display, an input/output interface (I/O interface), a universal serial bus (USB) port (which can be included as one of the ports of the I/O interface), a network interface, a power supply and/or a camera. FIG. 13 is merely illustrative and does not limit the structure of the above electronic device. For example, expansion device 1300 may also include more or less components than that shown in FIG. 13, or have a different configuration than that shown in FIG. 13.

Processor 1310 and/or other data processing circuits may be referred to herein generally as a "data processing circuit." The data processing circuit can be embodied in whole or in part as software, hardware, firmware or any combination thereof. Moreover, the data processing circuit can be a single individual processing module, or integrated in whole or in part into any of the other components in expansion device 1300. As referred to in the embodiments of the present application, the data processing circuit is controlled as a processor (for example, the selection of a variable resistance terminal path connected to the interface).

Processor 1310 receives data formatted according to a transport protocol, such as TCP/IP or UDP, from an application running on a host processor by way of an external bus to form received data. Processor 1310 also determines whether the received data is to be encrypted and, when the received data is to be encrypted, processes a security protocol, such as TLS/SSL, to generate encrypted data from the received data.

In addition, processor 1310 processes a transport layer protocol stack of the transport protocol to generate an outgoing IP communication from the received data when the received data is not to be encrypted, and from the encrypted data when the received data is to be encrypted. Further, processor 1310 sends the outgoing IP communication to network controller 1314 by way of internal bus 1324.

Network controller 1314, in turn, formats the outgoing IP communication to form a formatted IP communication, and transmits the formatted IP communication onto a network. Network controller 1314 also receives a data packet from the network, forms an incoming IP communication from the data packet, and sends the incoming IP communication to processor 1310 by way of internal bus 1324.

Processor 1310 also processes the transport layer protocol stack to generate processed data from the incoming IP communication, and determines whether the processed data is encrypted. In addition, processor 1310 processes the security protocol when the processed data is encrypted such that the security protocol generates decrypted data from the processed data.

Further, processor 1310 sends the processed data to the application running on the host processor by way of external bus 1322 when the processed data is not encrypted, and the decrypted data to the application running on the host processor by way of external bus 1322 when the processed data is not encrypted. Expansion processor 1310 and the host processor can reside on different cards in a rack where the backplane of the rack functions as external bus 1322.

Processor 1310 can call the information and the application program stored in the memory by a transmission device to perform the following steps: an expansion device starting a local transport layer security protocol to process a task according to an interface called by a host. After the transport layer security protocol processes the task, the expansion device uses a network protocol processing unit (for example, a TCP/IP processing unit) to encapsulate the processing result as a data message. A network controller deployed in the expansion device sends out the encapsulated data message.

Memory 1312 can be used to store software programs and modules of the application software, such as the program instruction/data storage device corresponding to the method for monitoring the network access status of the distribution network device in one or more embodiments of the present application. Processor 1310 runs the software program and the module stored in the memory 1312 so as to execute various functional applications and data processing. That is, implementing the method for monitoring the network access status of the distribution device in the application. Memory 1312 can include high speed random access memory, and can also include non-volatile memory, such as one or more magnetic storage devices, flash memory, or other non-volatile solid state memory. In some examples, memory 1312 can further include memory remotely located relative to processor 1310, and the remotely located memory can be connected to expansion device 1300 through a network. Examples of such networks include, but are not limited to, the Internet, intranets, local area networks, mobile communication networks, and combinations thereof.

Network controller 1314 receives or transmits data via a network. The network specific examples described above may include a wireless network provided by a communication provider of expansion device 1300. In one example, network controller 1314 includes a Network Interface Controller (NIC) that can be connected to other network devices through a base station to communicate with the Internet. In one example, network controller 1314 can be a radio frequency (RF) module for communicating with the Internet wirelessly. The display can be, for example, a touch screen liquid crystal display (LCD) that enables a user to interact with the user interface of expansion device 1300.

In some optional embodiments, expansion device 1300 shown in FIG. 13 above may include hardware components (including circuits), software components (including computer code stored in a computer readable medium), or a combination of both hardware and software components. FIG. 13 is only one example of a specific example among the examples, and is intended to show the types of components that may be present in the above-described expansion device 1300.

In some embodiments, expansion device 1300 illustrated in FIG. 13 above has a touch display (also referred to as a "touch screen" or "touch panel"). In some embodiments, expansion device 1300 shown in FIG. 13 above has a graphic user interface (GUI), and a user can interact with the GUI by touching a finger, and/or a gesture on a touch-sensitive surface thereof.

The human-computer interaction function herein includes the following interactions: creating web pages, drawing, word processing, making electronic documents, playing games, video conferencing, instant messaging, sending and receiving emails, talking interfaces, playing digital videos, playing digital music and/or web surfing, and so on. The executable instructions for performing the human-computer interaction functions described above are configured/stored in one or more processor-executable computer program products or readable storage media.

In this embodiment, expansion device 1300 can execute the program code of the following steps in the method for monitoring the network access status of the distribution device in the application: an expansion device starting a local transport layer security protocol to process a task according to an interface called by a host. After the transport layer security protocol processing the task, the expansion device uses a network protocol processing unit (for example, a TCP/IP processing unit) to encapsulate the processing result as a data message. A network controller deployed in the expansion device sends out the encapsulated data message.

Optionally, the foregoing processor may further execute the program code of the following steps: an expansion device starting a local transport layer security protocol to process a task according to an interface called by a host. After the transport layer security protocol processing the task, the expansion device uses a network protocol processing unit (for example, a TCP/IP processing unit) to encapsulate the processing result as a data message. A network controller deployed in the expansion device sends out the encapsulated data message.

Optionally, the foregoing processor may further execute the program code of the following steps: the host initiating a task, and an application of the host calling an interface of the transport layer security protocol of the expansion device so that the expansion device carries out the functions of a transport layer security protocol algorithm, a network (TCP/IP) protocol encapsulation, and an underlying network protocol stack.

Optionally, the foregoing processor may further execute the program code of the following steps: determining whether the transport layer security protocol is necessary to process the task; if it is necessary, arbitrating the task, and sending the task to an algorithm acceleration unit for processing, and then obtaining a processing result of the task. Optionally, the foregoing processor may further execute the program code of the following steps: the network (TCP/IP) protocol processing unit encapsulating the processing result and configuring the encapsulating result to the network controller.

Optionally, the foregoing processor may further execute the program code of the following steps: on the expansion device, a software stack is configured to run a service of the transport layer security protocol, an engine unit of the transport layer security protocol is configured to perform offloading an encryption and decryption algorithm, and hardware acceleration processing of the network (TCP/IP) protocol is carried out through a TCP offload engine (TOE).

Optionally, the foregoing processor may further execute the program code of the following steps: determining whether the TCP offload engine (TOE) exists in the expansion device; if it exists, the TCP offload engine (TOE) is configured to carry out the hardware acceleration processing of the network (TCP/IP) protocol. Optionally, the foregoing processor may further execute the program code of the following steps: that if the TCP offload engine does not exit, determine whether the resource usage of the expansion device exceeds a predetermined threshold, and if so, a load balancing scheduling module is configured to bypass a part of the traffic to the host for processing.

Optionally, the foregoing processor may further execute the program code of the following steps: an expansion device receiving a data message, and using a local network controller to send the data message to a network protocol processing unit (for example, a TCP/IP processing unit) for parsing; the expansion device processing the parsing result using a local transport layer security protocol; and the expansion device uploading the processing result to the host.

Optionally, the foregoing processor may further execute the program code of the following steps: determining whether the data in the parsing result is encrypted; if the data in the parsing result is not encrypted, directly uploading the parsing result to the host. If the data in the parsing result is encrypted, performing the step of processing the parsing result using the local transport layer security protocol.

Optionally, the foregoing processor may further execute the program code of the following steps: the transport layer security protocol layer processing the parsing result to obtain the processing result; and arbitrating the processing result and sending to a corresponding algorithm acceleration unit for encryption and decryption processing so as to obtain a decrypting result.

Optionally, the foregoing processor may further execute the program code of the following steps: determining whether a TCP offload engine (TOE) exists in the expansion device; if it exists, using the TCP offload engine (TOE) to perform the hardware acceleration processing of the network protocol processing unit (for example, a TCP/IP processing unit), and storing the data message in a memory area of the processor.

Optionally, the foregoing processor may further execute the program code of the following steps: the processor of the expansion device determining whether the parsing result needs to be sent to a secure socket layer of the transport layer security protocol for processing. If it needs, using the secure socket layer of the transport layer security protocol to process the parsing result. If it does not need, bypassing to the host to process the parsing results.

Optionally, the foregoing processor may further execute the program code of the following steps: in the process of using the secure socket layer of the transport layer security protocol to process the parsing result, the TCP offload engine encrypting and decrypting data by using a transport layer encryption device through calling a driver, and uploading to the host if the encrypting and decrypting result satisfies a predetermined condition.

Optionally, the foregoing processor may further execute the program code of the following steps: in the process of using the secure socket layer of the transport layer security protocol to process the parsing result, the TCP offload engine decrypting data by using a transport layer encryption device through calling a driver, and uploading the decrypting result to an application on the processor according to the type and destination address of the decrypting result, or uploading to the host through a host bus.

Optionally, the foregoing processor may further execute the program code of the following steps: if it does not exist, storing the data message in a memory area of the processor, or bypassing the data message to the host for processing. Optionally, the foregoing processor may further execute the program code of the following steps: the processor performing protocol stack processing on the data message. If it is necessary to perform TLS offload, sending the data message to the secure sockets layer (SSL) for decryption processing, and calling the transport layer security protocol to complete the hardware acceleration.

Optionally, the foregoing processor may further execute the program code of the following steps: if it is not necessary to perform TLS offload, uploading the decrypting result to the application on the processor according to the type and destination address of the decrypting result, or uploading to the host through a host bus.

Expansion device 1300 shown in FIG. 13 can also be a smartphone (such as an Android mobile phone, an iOS mobile phone, etc.), a tablet computer, a palm computer, or a mobile Internet device (Mobile Internet Device, MID), a PAD and other terminal devices. FIG. 13 does not limit the structure of the above electronic device. For example, expansion device 1300 can also include more or fewer components (such as a network interface, a display device, and so on) than those shown in FIG. 13, or have a different configuration than that shown in FIG. 13.

All or part of the steps of the foregoing embodiments may be completed by a program to instruct a terminal device related hardware. The program can be stored in a computer readable storage medium, and the storage medium may include a flash disk, a read-only memory (ROM), a random access memory (RAM), a magnetic disk or an optical disk.

The embodiments of the present application further provide a storage medium. Optionally, in the embodiment, the storage medium may be used to save the program code executed by the method for monitoring the network access status of the network device provided by the foregoing embodiment, where the storage medium is controlled during the process of running the program. The device performs an optional or preferred method of monitoring a network access status of a distribution network device of any of the embodiments.

Optionally, in this embodiment, the foregoing storage medium may be located in any one mobile device of a mobile terminal group in a computer network, or in any one mobile device of a mobile terminal group. Optionally, in the embodiment, the storage medium is configured to store the program code for executing the following steps: an expansion device starting a local transport layer security protocol to process a task according to an interface called by a host; after the transport layer security protocol processing the task, the expansion device using a network protocol processing unit (for example, a TCP/IP processing unit) to encapsulate the processing result as a data message; and a network controller deployed in the expansion device sending out the encapsulated data message.

Optionally, in the embodiment, the storage medium is configured to store the program code for executing the following steps: the host initiating a task, and an application of the host calling an interface of the transport layer security protocol of the expansion device, so that the expansion device carries out the functions of a transport layer security protocol algorithm, a network (TCP/IP) protocol encapsulation, and an underlying network protocol stack.

Optionally, in the embodiment, the storage medium is configured to store the program code for executing the following steps: determining whether the transport layer security protocol is necessary to process the task. If it is necessary, arbitrating the task, and sending the task to an algorithm acceleration unit for processing, and then obtaining a processing result of the task. Optionally, in the embodiment, the storage medium is configured to store the program code for executing the following steps: the network (TCP/IP) protocol processing unit encapsulating the processing result and configuring the encapsulating result to the network controller.

Optionally, in the embodiment, the storage medium is configured to store the program code for executing the following steps: on the expansion device, a software stack is configured to run a service of the transport layer security protocol, an engine unit of the transport layer security protocol is configured to perform offloading an encryption and decryption algorithm, and hardware acceleration processing of the network (TCP/IP) protocol is carried out through a TCP offload engine (TOE).

Optionally, in the embodiment, the storage medium is configured to store the program code for executing the following steps: determining whether the TCP offload engine (TOE) exists in the expansion device. If it exists, the TCP offload engine (TOE) is configured to carry out the hardware acceleration processing of the network (TCP/IP) protocol.

Optionally, in the embodiment, the storage medium is configured to store the program code for executing the following steps: that if the TCP offload engine does not exit, determine whether the resource usage of the expansion device exceeds a predetermined threshold. If so, a load balancing scheduling module is configured to bypass a part of the traffic to the host for processing.

Optionally, in the embodiment, the storage medium is configured to store the program code for executing the following steps: an expansion device receiving a data message, and using a local network controller to send the data message to a network protocol processing unit (for example, a TCP/IP processing unit) for parsing. The expansion device processing the parsing result using a local transport layer security protocol; and the expansion device uploading the processing result to the host.

Optionally, in the embodiment, the storage medium is configured to store the program code for executing the following steps: determining whether the data in the parsing result is encrypted. If the data in the parsing result is not encrypted, directly uploading the parsing result to the host; if the data in the parsing result is encrypted, performing the step of processing the parsing result using the local transport layer security protocol.

Optionally, in the embodiment, the storage medium is configured to store the program code for executing the following steps: the transport layer security protocol layer processing the parsing result to obtain the processing result; and arbitrating the processing result and sending to a corresponding algorithm acceleration unit for encryption and decryption processing so as to obtain a decrypting result.

Optionally, in the embodiment, the storage medium is configured to store the program code for executing the following steps: determining whether a TCP offload engine (TOE) exists in the expansion device; if it exists, using the TCP offload engine (TOE) to perform the hardware acceleration processing of the network protocol processing unit (for example, a TCP/IP processing unit), and storing the data message in a memory area of the processor.

Optionally, in the embodiment, the storage medium is configured to store the program code for executing the following steps: the processor of the expansion device determining whether the parsing result needs to be sent to a secure socket layer of the transport layer security protocol for processing. If it needs, using the secure socket layer of the transport layer security protocol to process the parsing result. If it does not need, bypassing to the host to process the parsing results.

Optionally, in the embodiment, the storage medium is configured to store the program code for executing the following steps: in the process of using the secure socket layer of the transport layer security protocol to process the parsing result, the TCP offload engine encrypting and decrypting data by using a transport layer encryption device through calling a driver, and uploading to the host if the encrypting and decrypting result satisfies a predetermined condition.

Optionally, in the embodiment, the storage medium is configured to store the program code for executing the following steps: in the process of using the secure socket layer of the transport layer security protocol to process the parsing result, the TCP offload engine decrypting data by using a transport layer encryption device through calling a driver, and uploading the decrypting result to an application on the processor according to the type and destination address of the decrypting result, or uploading to the host through a host bus.

Optionally, in the embodiment, the storage medium is configured to store the program code for executing the following steps: if it does not exist, storing the data message in a memory area of the processor, or bypassing the data message to the host for processing. Optionally, in the embodiment, the storage medium is configured to store the program code for executing the following steps: the processor performing protocol stack processing on the data message. If it is necessary to perform TLS offload, sending the data message to the secure sockets layer (SSL) for decryption processing, and calling the transport layer security protocol to complete the hardware acceleration.

Optionally, in the embodiment, the storage medium is configured to store the program code for executing the following steps: if it is not necessary to perform TLS offload, uploading the decrypting result to the application on the processor according to the type and destination address of the decrypting according result, or uploading to the host through a host bus.

The embodiments of the present application further provide a system for offloading an algorithm, comprising a processor, and a memory, which is coupled to the processor for providing the processor with instructions to process the following processing steps:

an expansion device starting a local transport layer security protocol to process a task according to an interface called by a host;

after the transport layer security protocol processing the task, the expansion device using a network protocol processing unit (for example, a TCP/IP processing unit) to encapsulate the processing result as a data message; and a network controller deployed in the expansion device sending out the encapsulated data message.

It can be seen from the above that in the foregoing embodiment of the present application, in the process of sending data to the web browser by the server host, the expansion device starts the local transport layer security protocol (TLS/SSL) according to the interface called by the host to process the task related to the host sending data, and after the transport layer security protocol (TLS/SSL) processes the related tasks, the network protocol processing unit (for example, a TCP/IP processing unit) inside the expansion device is further used to perform TCP/IP encapsulation for the processing result as a data message. Finally, the network controller deployed in the expansion device sends out the encapsulated data message, so that the expansion card completes almost all the processes under the TLS/SSL protocol layer, thereby reducing the computational pressure on the host. More computing resources are thus provided for the application, and the technical effects of delay and throughput in the secure network protocol are ensured by the parallel computing kernel on the expansion card, thereby solving the technical problem of the local hardware offloading solution employed in the prior art that the resource usage on the server host is still relatively large.

The embodiments of the present application further provide a system for offloading an algorithm, comprising a processor, and a memory, which is coupled to the processor for providing the processor with instructions to process the following processing steps:

an expansion device receiving a data message, and using a local network controller to send the data message to a network protocol processing unit (for example, a TCP/IP processing unit) for parsing; the expansion device processing the parsing result using a local transport layer security protocol; and the expansion device uploading the processing result to the host.

It can be seen from the above that in the foregoing embodiment of the present application, in the process of receiving the data sent from the web browser by the server host, the expansion device receives a data message and performs TCP/IP parsing with the processing result as the data message by using a network protocol processing unit (for example, a TCP/IP processing unit) inside the expansion device, so as to obtain the parsing result, and uses an expansion device local transmission layer security protocol (TLS/SSL) to process the parsing result, and uploads the processing result to the host (that is, the server host), so that the expansion card completes almost all the processes under the TLS/SSL protocol layer, thereby reducing the computational pressure on the host. More computing resources are thus provided for the application, and the technical effects of delay and throughput in the secure network protocol are ensured by the parallel computing kernel on the expansion card, thereby solving the technical problem of the local hardware offloading solution employed in the prior art that the resource usage on the server host is still relatively large.

Figure 14:
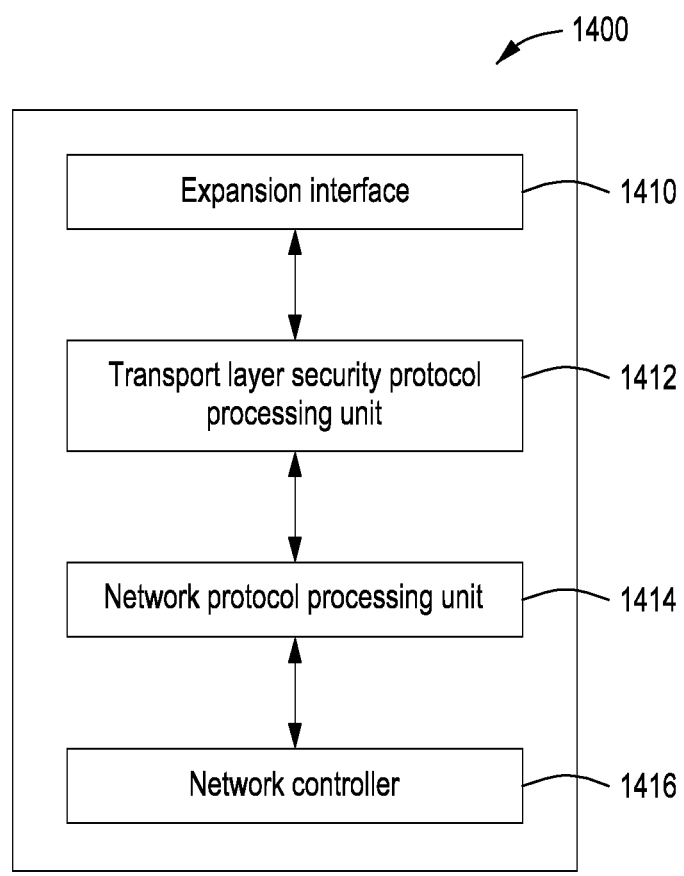
FIG. 14 is a block diagram illustrating an example of an integrated chip 1400 in accordance with one or more embodiments of the present invention.

FIG. 14 shows a block diagram that illustrates an example of an integrated chip 1400 in accordance with one or more embodiments of the present invention. As shown in FIG. 14, integrated chip 1400, which can implement methods 500, 520, 530, 540, 700, 730, 740, 750, and 770, includes an expansion interface 1410 which is coupled to a host, wherein the host is configured to provide an application. Integrated chip 1400 also includes a transport layer security protocol processing unit 1412 which processes a task according to an interface called by the host, a network protocol processing unit 1414 which communicates with the transport layer security protocol processing unit, and encapsulates or parses a data message, and a network controller 1416 which sends or receives a data message. Integrated chip 1400 can be installed on the server host in an embedded manner, or can be connected to the server host through various bus interfaces (for example, a PCIe interface).

It can be seen from the above that in the foregoing embodiment of the present application, expansion interface 1410 is coupled to the server host. In the process of sending data to the web browser by the server host, transport layer security protocol processing unit 1412, according to the interface called by the host, processes the task related to the host sending data.

After the transport layer security protocol (TLS/SSL) processes the related tasks, network protocol processing unit 1414 (for example, a TCP/IP processing unit) is further used to perform protocol encapsulation (for example, TCP/IP encapsulation) for the processing result as a data message. Finally, network controller 1416 sends out the encapsulated data message. Moreover, in the process of receiving the data sent from the web browser by the server host, network controller 1416 receives the data message and the received data are parsed by using network protocol processing unit 1414, then the parsing result is processed by transport layer security protocol processing unit 1412, and the processing result is then uploaded to the host (that is, the server host) via the expansion interface 1410.

In this way, the expansion card completes almost all the processes under the TLS/SSL protocol layer, thereby reducing the computational pressure on the host. More computing resources are thus provided for the application, and the technical effects of delay and throughput in the secure network protocol are ensured by the parallel computing kernel on the expansion card, thereby solving the technical problem of the local hardware offloading solution employed in the prior art that the resource usage on the server host is still relatively large.

The sequence numbers of the embodiments of the present application are merely for the description, and do not represent the advantages and disadvantages of the embodiments. In the above-mentioned embodiments of the present application, the descriptions of the various embodiments have different focuses, and the parts that are not detailed in a certain embodiment can be referred to the related descriptions of other embodiments.

In the embodiments provided by the present application, it should be understood that the disclosed technical contents may be implemented in other manners. The device embodiments described above are only schematic. For example, the division of the unit is only a logical functional division. In an implementation in practice, there may be another division manner.

For example, multiple units or components may be combined or integrated into a different system, or some features can be ignored or not executed. In addition, the coupling or direct coupling or communication connection shown or discussed may be an indirect coupling or communication connection through some interface, unit or module, and it may be electrical connection or other connections.

The units described as separate components may or may not be physically separated, and the components displayed as units may or may not be physical units, that is, they may be located in one place, or may be distributed to multiple network units. Some or all of the units may be selected according to actual needs to achieve the purpose of the solution of a certain embodiment.

In addition, each functional unit in one embodiment of the present application may be integrated into one processing unit, or each unit may exist physically separately, or two or more units may be integrated into one unit. The above integrated unit can be implemented in the form of hardware or in the form of a software functional unit.

The integrated unit, if implemented in the form of a software functional unit and sold or used as a standalone product, may be stored in a computer readable storage medium. Based on such understanding, the technical solution of the present application, in essence or the contribution to the prior art, all or part of the technical solution may be embodied in the form of a software product stored in a storage medium.

A number of instructions are included to cause a computer device (which may be a personal computer, a server or a network device, etc.) to perform all or part of the steps of the methods described in various embodiments of the present application. The foregoing storage medium includes: a USB drive, a read-only memory (ROM), a random access memory (RAM), a removable hard disk, a magnetic disk, an optical disk, and the like.

The above description is only a few preferred embodiments of the present application, and it should be noted that a person skilled in the art can also make several improvements and modifications without departing from the principles of the present application, which should be considered as within the scope of protection of this application.

What is claimed is:

1. An expansion device, comprising:
a memory;
a network controller; and
an expansion processor coupled to the memory and the network controller, the expansion processor configured to:
receive an application communication formatted according to a transport protocol from an application running on a host processor by way of an external bus to form received data;
determine, in response to receipt of the received data, whether the received data is to be encrypted;
process a security protocol when the received data is to be encrypted, the security protocol to generate encrypted data from the received data;
process a transport layer protocol stack of the transport protocol to generate an outgoing IP datagram from the received data when the received data is not to be encrypted, wherein the generation of the outgoing IP datagram includes encapsulation of the received data;
process the transport layer protocol stack of the transport protocol to generate the outgoing IP datagram from the encrypted data when the received data is to be encrypted, wherein the generation of the outgoing IP datagram includes encapsulation of the encrypted data; and
send the outgoing IP datagram to the network controller by way of an internal bus, the network controller to format the outgoing IP datagram to form a formatted IP frame, and transmit the formatted IP frame onto a network.

2. The expansion device of claim 1, wherein the network controller is configured to:
receive a data packet from the network,
form an incoming IP communication from the received data packet, and
send the incoming IP communication to the expansion processor by way of the internal bus.

3. The expansion device of claim 2, wherein the expansion processor is further configured to:
process the transport layer protocol stack to generate processed data from the incoming IP communication;
determine whether the processed data is encrypted;
process the security protocol when the processed data is encrypted, the security protocol to generate decrypted data from the processed data; and
send the processed data to the application running on the host processor by way of the external bus when the processed data is not encrypted, and the decrypted data to the application running on the host processor by way of the external bus when the processed data is encrypted.

4. The expansion device of claim 3, wherein the transport protocol includes one of TCP/IP and UDP.

5. The expansion device of claim 3, wherein the security protocol includes TLS/SSL.

6. The expansion device of claim 3, wherein the expansion processor resides on a first card, and the host processor resides on a second card.

7. The expansion device of claim 1, wherein the transport protocol includes one of TCP/IP and UDP.

8. The expansion device of claim 1, wherein the generation of the outgoing IP datagram further includes dividing the received data into a plurality of segments.

9. A method of operating an expansion device, the method comprising:
receiving first and second application communications formatted according to a transport protocol from an application running on a host processor by way of an external bus to form first received data and second received data;
determining, in response to receiving the first received data, that the first received data is not to be encrypted;
processing a transport layer protocol stack of the transport protocol to generate a first outgoing IP datagram from the first received data, wherein the generation of the first outgoing IP datagram includes encapsulation of the first received data;
determining, in response to receiving the second received data, that the second received data is to be encrypted;
processing a security protocol when the second received data is to be encrypted, the security protocol to generate encrypted data from the second received data;

processing the transport layer protocol stack of the transport protocol to generate a second outgoing IP datagram from the encrypted data, wherein the generation of the second outgoing IP datagram includes encapsulation of the encrypted data;

sending the first outgoing IP datagram and the second outgoing IP datagram to a network controller by way of an internal bus; and formatting the first outgoing IP datagram and the second outgoing IP datagram to form formatted IP frames, and transmitting the formatted IP frames onto a network.

10. The method of claim 9, further comprising:

receiving a data packet from the network, forming an incoming IP communication from the received data packet, and sending the incoming IP communication to an expansion processor by way of the internal bus.

11. The method of claim 10, further comprising:

processing the transport layer protocol stack to generate processed data from the incoming IP communication;

determining whether the processed data is encrypted;

processing the security protocol when the processed data is encrypted, the security protocol to generate decrypted data from the processed data; and sending the processed data to the application running on the host processor by way of the external bus when the processed data is not encrypted, and the decrypted data to the application running on the host processor by way of the external bus when the processed data is encrypted.

12. The method of claim 11, wherein the transport protocol includes one of TCP/IP and UDP.

13. The method of claim 11, wherein the security protocol includes TLS/SSL.

14. The method of claim 11, wherein the expansion processor resides on a first card, and the host processor resides on a second card.

15. The method of claim 9, wherein the generation of the first outgoing IP datagram further includes dividing the first received data into a plurality of segments.

16. A non-transitory computer-readable storage medium having embedded therein program instructions, which when executed by a processor causes the processor to execute a method of operating an expansion device, the method comprising:

receiving an application communication formatted according to a transport protocol from an application running on a host processor by way of an external bus to form received data;

determining, in response to receiving the received data, whether the received data is to be encrypted;

processing a security protocol when the received data is to be encrypted, the security protocol to generate encrypted data from the received data;

processing a transport layer protocol stack of the transport protocol to generate an outgoing IP datagram from the received data when the received data is not to be encrypted, wherein the generation of the outgoing IP datagram includes encapsulation of the received data;

processing the transport layer protocol stack of the transport protocol to generate the outgoing IP datagram from the encrypted data when the received data is to be encrypted, wherein the generation of the outgoing IP datagram includes encapsulation of the encrypted data;

sending the outgoing IP datagram to a network controller by way of an internal bus; and formatting the outgoing IP datagram to form a formatted IP frame, and transmitting the formatted IP frame onto a network.

17. The medium of claim 16, wherein the method further comprises:

receiving a data packet from the network, forming an incoming IP communication from the received data packet, and sending the incoming IP communication to an expansion processor by way of the internal bus.

18. The medium of claim 17, wherein the method further comprises:

processing the transport layer protocol stack to generate processed data from the incoming IP communication;

determining whether the processed data is encrypted;

processing the security protocol when the processed data is encrypted, the security protocol to generate decrypted data from the processed data; and sending the processed data to the application running on the host processor by way of the external bus when the processed data is not encrypted, and the decrypted data to the application running on the host processor by way of the external bus when the processed data is encrypted.

19. The medium of claim 17 wherein the expansion processor resides on a first card, and the host processor resides on a second card.

20. The medium of claim 16, wherein the transport protocol includes one of TCP/IP and UDP.

21. The medium of claim 16, wherein the security protocol includes TLS/SSL.

* * * * *